(12) United States Patent
Trautner et al.

(10) Patent No.: US 7,762,349 B2
(45) Date of Patent: Jul. 27, 2010

(54) MULTI-SPEED DRILL AND TRANSMISSION WITH LOW GEAR ONLY CLUTCH

(75) Inventors: Paul K. Trautner, York, PA (US); David E. Scheerer, Glen Mills, MD (US); James D. Schroeder, Dallastown, PA (US); Dennis A. Bush, Dillsburg, PA (US)

(73) Assignee: Black & Decker Inc., Newark, DE (US)

( * ) Notice: Subject to any disclaimer, the term of this patent is extended or adjusted under 35 U.S.C. 154(b) by 230 days.

(21) Appl. No.: 11/986,687

(22) Filed: Nov. 21, 2007

(65) Prior Publication Data

US 2009/0129876 A1    May 21, 2009

(51) Int. Cl.
*B23Q 5/12* (2006.01)

(52) U.S. Cl. .................. 173/176; 173/48; 173/104; 173/178

(58) Field of Classification Search ............ 173/48, 173/176, 178, 104
See application file for complete search history.

(56) References Cited

U.S. PATENT DOCUMENTS

| | | |
|---|---|---|
| 799,131 A | 9/1905 | Woodruff |
| 1,325,464 A | 12/1919 | Decker |
| 1,411,538 A | 4/1922 | Sweetland |
| 1,503,809 A | 8/1924 | Schulz et al. |
| 1,511,566 A | 10/1924 | Kollock |
| 1,518,089 A | 12/1924 | Manquen |
| 1,651,822 A | 12/1927 | Johnston |
| 1,805,692 A | 5/1931 | Ferenci |
| 1,915,542 A | 6/1933 | Lundin et al. |
| 2,024,276 A | 12/1935 | Desoutter |
| 2,225,091 A | 12/1940 | Wilhide |
| 2,263,709 A | 11/1941 | Sittert |

(Continued)

FOREIGN PATENT DOCUMENTS

CH          546615          3/1974

(Continued)

OTHER PUBLICATIONS

Extended European Search Report dated Mar. 16, 2009.

(Continued)

*Primary Examiner*—Rinaldi I. Rada
*Assistant Examiner*—Gloria R. Weeks
(74) *Attorney, Agent, or Firm*—Harness, Dickey & Pierce, P.L.C.

(57) ABSTRACT

A multi-speed drill includes a housing with a motor including an output member. A constant mesh parallel axis transmission can be disposed in the housing and can include a high speed and low speed gears. A clutch member can be associated with the low speed gear. A conical spring can bias the low speed gear and the clutch member together for torque transfer up to a predetermined torque level. Above the predetermined level, cam surfaces between the low speed gear and the clutch member move them apart, thereby limiting torque transfer to the output spindle. In the high speed mode the torque transfer between the input pinion and the output spindle bypasses the clutch member. The maximum torque level capable of being generated at the output spindle in the high speed mode can be less than the predetermined torque level.

20 Claims, 21 Drawing Sheets

U.S. PATENT DOCUMENTS

| | | |
|---|---|---|
| 2,344,673 A | 3/1944 | Brown |
| 2,456,571 A | 12/1948 | Turner et al. |
| 2,531,849 A | 11/1950 | Karleen |
| 2,631,696 A | 3/1953 | Yarber |
| 2,668,426 A | 2/1954 | Hoover |
| 2,692,486 A | 10/1954 | Anderson |
| 2,727,602 A | 12/1955 | Saives |
| 2,834,442 A | 5/1958 | Sturrock |
| 2,854,831 A | 10/1958 | Rothweiler |
| 2,860,498 A | 11/1958 | Crossley |
| 2,868,426 A | 1/1959 | Groves |
| 2,873,832 A | 2/1959 | Helm |
| 2,882,704 A | 4/1959 | Quackenbush |
| 2,911,841 A | 11/1959 | Miller |
| 2,942,490 A | 6/1960 | Riley et al. |
| 2,957,323 A | 10/1960 | Elliott et al |
| 2,995,226 A | 8/1961 | Gilder |
| 3,005,325 A | 10/1961 | Eckman |
| 3,021,723 A | 2/1962 | Happe |
| 3,028,763 A | 4/1962 | Vetsch |
| 3,030,818 A | 4/1962 | Zager |
| 3,110,381 A | 11/1963 | Leu |
| 3,120,845 A | 2/1964 | Horner |
| 3,178,955 A | 4/1965 | Enders et al. |
| 3,178,956 A | 4/1965 | Stanley |
| 3,205,985 A | 9/1965 | Pearl |
| 3,243,023 A | 3/1966 | Boyden et al. |
| 3,244,030 A | 4/1966 | Godfret |
| 3,295,187 A | 1/1967 | Plummer |
| 3,329,185 A | 7/1967 | Hettich et al. |
| 3,334,448 A | 8/1967 | Alexander |
| 3,357,275 A | 12/1967 | Green, Jr. et al. |
| 3,396,593 A | 8/1968 | Moores, Jr. |
| 3,413,498 A | 11/1968 | Bowen, III et al. |
| 3,432,703 A | 3/1969 | Cheps et al. |
| 3,433,082 A | 3/1969 | Bitter et al. |
| 3,436,994 A | 4/1969 | Diener et al. |
| 3,491,840 A | 1/1970 | Haviland et al. |
| 3,500,696 A | 3/1970 | Berube |
| 3,517,574 A | 6/1970 | Glatfelter |
| 3,545,310 A | 12/1970 | Porath et al. |
| 3,545,776 A | 12/1970 | Haviland |
| 3,546,502 A | 12/1970 | Botefuhr et al. |
| 3,586,143 A | 6/1971 | Hutchison |
| 3,652,879 A | 3/1972 | Plunkett et al. |
| 3,679,244 A | 7/1972 | Reddy |
| 3,680,642 A | 8/1972 | Kirn et al. |
| 3,685,594 A | 8/1972 | Koehler |
| 3,686,957 A | 8/1972 | Kirn et al. |
| 3,691,407 A | 9/1972 | Klett et al. |
| 3,699,366 A | 10/1972 | Wood |
| 3,703,646 A | 11/1972 | Jacyno |
| 3,736,992 A | 6/1973 | Zanda et al. |
| 3,777,825 A | 12/1973 | Gullich |
| 3,785,443 A | 1/1974 | Armbruster |
| 3,789,933 A | 2/1974 | Jarecki |
| 3,794,124 A | 2/1974 | Biersack |
| 3,799,275 A | 3/1974 | Plattenhardt et al. |
| 3,808,904 A | 5/1974 | Botsch et al. |
| 3,809,168 A | 5/1974 | Fromm |
| 3,818,255 A | 6/1974 | Wagner |
| 3,827,276 A | 8/1974 | Willers |
| 3,829,722 A | 8/1974 | Rosenthal, Jr. et al. |
| 3,831,048 A | 8/1974 | Wagner |
| 3,834,468 A | 9/1974 | Hettich et al. |
| 3,835,715 A | 9/1974 | Howell |
| 3,837,410 A | 9/1974 | Maxwell |
| 3,845,373 A | 10/1974 | Totsu et al. |
| 3,866,692 A | 2/1975 | Stelljes |
| 3,872,951 A | 3/1975 | Hastings, Jr. |
| 3,877,253 A | 4/1975 | Yeagle |
| 3,915,034 A | 10/1975 | Ward |
| 3,924,692 A | 12/1975 | Saari |
| 3,934,688 A | 1/1976 | Sides et al. |
| 3,955,628 A | 5/1976 | Grozinger et al. |
| 3,955,629 A | 5/1976 | Turner |
| 3,959,677 A | 5/1976 | Grieb |
| 3,998,278 A | 12/1976 | Stiltz et al. |
| 4,050,875 A | 9/1977 | Katzman et al. |
| 4,081,704 A | 3/1978 | Vassos et al. |
| 4,082,151 A | 4/1978 | Finney |
| 4,098,351 A | 7/1978 | Alessio |
| 4,103,914 A | 8/1978 | Rohm |
| 4,158,313 A | 6/1979 | Smith |
| 4,158,970 A | 6/1979 | Laughon |
| 4,159,050 A | 6/1979 | Hopkins, Sr. et al. |
| 4,161,242 A | 7/1979 | Moores, Jr. et al. |
| 4,173,849 A | 11/1979 | Mar |
| 4,199,160 A | 4/1980 | Bent |
| 4,204,580 A | 5/1980 | Nalley |
| 4,223,744 A | 9/1980 | Lovingood |
| 4,229,981 A | 10/1980 | Macky |
| 4,232,750 A | 11/1980 | Antipov et al. |
| 4,238,978 A | 12/1980 | Leone |
| 4,265,347 A | 5/1981 | Dischler |
| 4,267,914 A | 5/1981 | Saar |
| 4,277,074 A | 7/1981 | Kilberis |
| 4,280,359 A | 7/1981 | Schmid et al. |
| 4,305,541 A | 12/1981 | Barrett et al. |
| 4,306,264 A | 12/1981 | Alessio |
| 4,314,170 A | 2/1982 | Sahrbacker |
| 4,317,578 A | 3/1982 | Welch |
| 4,324,512 A | 4/1982 | Siroky |
| 4,389,146 A | 6/1983 | Coder |
| 4,390,311 A | 6/1983 | Kuhlmann |
| 4,400,995 A | 8/1983 | Palm |
| 4,407,615 A | 10/1983 | Kuhlmann |
| 4,410,846 A | 10/1983 | Gerber et al. |
| 4,418,766 A | 12/1983 | Grossmann |
| 4,443,137 A | 4/1984 | Albrent et al. |
| 4,450,672 A | 5/1984 | Dynie |
| 4,456,076 A | 6/1984 | Schmid et al. |
| 4,460,296 A | 7/1984 | Sivertson, Jr. |
| 4,467,896 A | 8/1984 | Sauerwein et al. |
| 4,468,826 A | 9/1984 | Moores, Jr. |
| 4,474,077 A | 10/1984 | Debelius |
| 4,479,555 A | 10/1984 | Grossmann et al. |
| 4,489,525 A | 12/1984 | Heck |
| 4,493,223 A | 1/1985 | Kishi et al. |
| 4,498,682 A | 2/1985 | Glore |
| 4,506,743 A | 3/1985 | Grossmann |
| 4,523,116 A | 6/1985 | Dibbern et al. |
| 4,527,680 A | 7/1985 | Sato |
| 4,540,318 A | 9/1985 | Hornung et al. |
| 4,559,577 A | 12/1985 | Shoji et al. |
| 4,569,125 A | 2/1986 | Antl et al. |
| 4,573,380 A | 3/1986 | Bald |
| 4,582,331 A | 4/1986 | Rohm |
| 4,585,077 A | 4/1986 | Bergler |
| 4,592,560 A | 6/1986 | Neumaier et al. |
| 4,604,006 A | 8/1986 | Shoji et al. |
| 4,616,525 A | 10/1986 | Ueberschar |
| 4,623,810 A | 11/1986 | Smith |
| 4,635,502 A | 1/1987 | George |
| 4,655,103 A | 4/1987 | Schreiber et al. |
| 4,669,930 A | 6/1987 | Stenmark |
| 4,682,918 A | 7/1987 | Palm |
| 4,695,065 A | 9/1987 | Komatsu et al. |
| 4,706,791 A | 11/1987 | Magliano |
| 4,710,071 A | 12/1987 | Koehler et al. |
| 4,754,669 A | 7/1988 | Verdier et al. |
| 4,762,035 A | 8/1988 | Fushiya et al. |
| 4,763,733 A | 8/1988 | Neumaier |
| 4,775,269 A | 10/1988 | Brix |

| | | | | | | |
|---|---|---|---|---|---|---|
| 4,780,654 | A | 10/1988 | Shoji et al. | 5,624,013 | A | 4/1997 | Tsai |
| 4,804,048 | A | 2/1989 | Porth, Jr. | 5,628,374 | A | 5/1997 | Dibbern, Jr. |
| 4,819,319 | A | 4/1989 | Rohm | 5,653,294 | A | 8/1997 | Thurler |
| 4,823,885 | A | 4/1989 | Okumura | 5,704,257 | A | 1/1998 | Kottke et al. |
| 4,824,298 | A | 4/1989 | Lippacher et al. | 5,704,433 | A | 1/1998 | Bourner et al. |
| 4,831,364 | A | 5/1989 | Shinohara et al. | 5,711,379 | A | 1/1998 | Amano et al. |
| 4,834,192 | A | 5/1989 | Hansson | 5,711,380 | A | 1/1998 | Chen |
| 4,836,563 | A | 6/1989 | Rohm | 5,718,014 | A | 2/1998 | deBlois et al. |
| 4,848,779 | A | 7/1989 | Wheeler et al. | 5,722,894 | A | 3/1998 | Kojima |
| 4,878,405 | A | 11/1989 | Wolfe | 5,732,805 | A | 3/1998 | Nakamura |
| 4,885,511 | A | 12/1989 | Millauer et al. | 5,738,177 | A | 4/1998 | Schell et al. |
| 4,898,249 | A | 2/1990 | Ohmori | 5,787,996 | A | 8/1998 | Funfer |
| 4,901,831 | A | 2/1990 | Ito et al. | 5,788,021 | A | 8/1998 | Tsai |
| 4,902,025 | A | 2/1990 | Zimdars | 5,842,527 | A | 12/1998 | Arakawa et al. |
| 4,955,623 | A | 9/1990 | Rohm | 5,857,814 | A | 1/1999 | Jang |
| 5,004,054 | A | 4/1991 | Sheen | 5,868,208 | A | 2/1999 | Peisert et al. |
| 5,007,776 | A | 4/1991 | Shoji | 5,896,973 | A | 4/1999 | Hochmuth et al. |
| 5,014,793 | A | 5/1991 | Germanton et al. | 5,947,254 | A | 9/1999 | Jones |
| 5,016,501 | A | 5/1991 | Holzer, Jr. | 5,951,026 | A | 9/1999 | Harman, Jr. et al. |
| 5,016,591 | A | 5/1991 | Nanyoshi et al. | 5,984,022 | A | 11/1999 | Harman, Jr. et al. |
| 5,025,903 | A | 6/1991 | Elligson | 5,992,257 | A | 11/1999 | Nemetz et al. |
| 5,035,547 | A | 7/1991 | Shoji | 6,010,426 | A | 1/2000 | Nakamura |
| 5,036,928 | A | 8/1991 | Mark | 6,015,017 | A | 1/2000 | Lauterwald |
| 5,044,643 | A | 9/1991 | Nakamura | 6,035,947 | A | 3/2000 | Chung |
| 5,052,497 | A | 10/1991 | Houben et al. | 6,047,971 | A | 4/2000 | Harman, Jr. et al. |
| 5,054,796 | A | 10/1991 | Rohm | 6,070,675 | A | 6/2000 | Mayer et al. |
| 5,056,607 | A | 10/1991 | Sanders | 6,072,675 | A | 6/2000 | Murakami et al. |
| 5,062,743 | A | 11/1991 | Wieland et al. | 6,079,716 | A | 6/2000 | Harman, Jr. et al. |
| 5,083,620 | A | 1/1992 | Fushiya | 6,082,221 | A | 7/2000 | Boing et al. |
| 5,085,126 | A | 2/1992 | Mukoyama | 6,086,282 | A | 7/2000 | Dutt et al. |
| 5,089,729 | A | 2/1992 | Moores, Jr. | 6,107,762 | A | 8/2000 | Schauer |
| 5,096,339 | A | 3/1992 | Shoji | 6,109,364 | A | 8/2000 | Demuth et al. |
| 5,105,130 | A | 4/1992 | Barker et al. | 6,127,751 | A | 10/2000 | Kristen et al. |
| 5,113,951 | A | 5/1992 | Houben et al. | 6,138,772 | A | 10/2000 | Miescher et al. |
| 5,115,175 | A | 5/1992 | Fletcher | 6,139,228 | A | 10/2000 | Longo |
| 5,125,142 | A | 6/1992 | Kosho et al. | 6,142,242 | A | 11/2000 | Okumura et al. |
| 5,171,030 | A | 12/1992 | Rohm | 6,144,121 | A | 11/2000 | Ishida et al. |
| 5,172,923 | A | 12/1992 | Nakamura | 6,144,122 | A | 11/2000 | Covell et al. |
| 5,183,274 | A | 2/1993 | Sakamaki | 6,162,154 | A | 12/2000 | Davis |
| 5,195,760 | A | 3/1993 | Wheeler et al. | 6,176,321 | B1 | 1/2001 | Arakawa et al. |
| 5,213,017 | A | 5/1993 | Jones et al. | 6,176,801 | B1 | 1/2001 | Chen |
| 5,236,206 | A | 8/1993 | Rohm | D437,761 | S | 2/2001 | Okumura et al. |
| 5,238,336 | A | 8/1993 | Sanders et al. | 6,192,996 | B1 | 2/2001 | Sakaguchi et al. |
| 5,259,465 | A | 11/1993 | Mukoyama | D439,123 | S | 3/2001 | Sakai et al. |
| 5,261,679 | A | 11/1993 | Nakamura | 6,196,554 | B1 | 3/2001 | Gaddis et al. |
| 5,271,471 | A | 12/1993 | Sasaki | 6,199,640 | B1 | 3/2001 | Hecht |
| 5,272,845 | A | 12/1993 | Burkley | 6,202,759 | B1 | 3/2001 | Chen |
| 5,277,527 | A | 1/1994 | Yokota et al. | 6,213,222 | B1 | 4/2001 | Banach |
| 5,311,089 | A | 5/1994 | Straetgen et al. | 6,213,224 | B1 | 4/2001 | Furuta et al. |
| 5,322,303 | A | 6/1994 | Nakamura | 6,223,833 | B1 | 5/2001 | Thurler et al. |
| 5,325,931 | A | 7/1994 | Woods | 6,230,819 | B1 | 5/2001 | Chen |
| 5,343,961 | A | 9/1994 | Ichikawa | 6,241,259 | B1 | 6/2001 | Gaddis et al. |
| 5,346,023 | A | 9/1994 | Takagi et al. | 6,248,007 | B1 | 6/2001 | deBlois et al. |
| 5,351,039 | A | 9/1994 | Oketani et al. | 6,273,200 | B1 | 8/2001 | Smith et al. |
| 5,375,857 | A | 12/1994 | Rohm | 6,277,013 | B1 | 8/2001 | Sasaki et al. |
| 5,375,858 | A | 12/1994 | Rohm | 6,279,714 | B1 | 8/2001 | Hsu |
| 5,407,215 | A | 4/1995 | Yang | 6,293,559 | B1 | 9/2001 | Harman, Jr. et al. |
| 5,430,944 | A | 7/1995 | Shilling | 6,305,481 | B1 | 10/2001 | Yamazaki et al. |
| 5,451,127 | A | 9/1995 | Chung | 6,311,787 | B1 | 11/2001 | Berry et al. |
| 5,456,324 | A | 10/1995 | Takagi et al. | 6,350,087 | B1 | 2/2002 | Berry et al. |
| 5,458,206 | A | 10/1995 | Bourner et al. | 6,394,191 | B1 | 5/2002 | Nakane et al. |
| 5,458,345 | A | 10/1995 | Amyot | 6,431,289 | B1 | 8/2002 | Potter et al. |
| 5,464,230 | A | 11/1995 | Rohm | 6,446,734 | B1 | 9/2002 | Williams et al. |
| 5,496,139 | A | 3/1996 | Ghode et al. | 6,455,186 | B1 | 9/2002 | Moores, Jr. et al. |
| 5,526,460 | A | 6/1996 | DeFrancesco et al. | 6,457,535 | B1 | 10/2002 | Tanaka |
| 5,533,581 | A | 7/1996 | Barth et al. | RE37,905 | E | 11/2002 | Bourner et al. |
| 5,558,478 | A | 9/1996 | Odendahl et al. | 6,479,958 | B1 | 11/2002 | Thompson et al. |
| 5,563,482 | A | 10/1996 | Shaw et al. | 6,488,286 | B2 | 12/2002 | Yaksich |
| 5,573,074 | A | 11/1996 | Thames et al. | 6,488,287 | B2 | 12/2002 | Gaddis et al. |
| 5,577,872 | A | 11/1996 | Nakamura | 6,488,451 | B1 | 12/2002 | Hartman |
| 5,584,619 | A | 12/1996 | Guzzella | 6,497,316 | B1 | 12/2002 | Hsu |
| 5,588,496 | A | 12/1996 | Elger | 6,502,648 | B2 | 1/2003 | Wiens |
| 5,624,000 | A | 4/1997 | Miller | D470,379 | S | 2/2003 | Andriolo |

| | | |
|---|---|---|
| 6,513,604 B2 | 2/2003 | Hanke |
| 6,520,267 B2 | 2/2003 | Funfer et al. |
| 6,536,536 B1 | 3/2003 | Gass et al. |
| 6,543,549 B1 | 4/2003 | Riedl et al. |
| 6,550,546 B2 | 4/2003 | Thurler et al. |
| 6,557,648 B2 | 5/2003 | Ichijyou et al. |
| 6,586,855 B2 | 7/2003 | Burger et al. |
| 6,595,300 B2 | 7/2003 | Milbourne |
| 6,612,476 B2 | 9/2003 | Smolinski |
| 6,645,666 B1 | 11/2003 | Moores, Jr. et al. |
| 6,655,470 B1 | 12/2003 | Chen |
| 6,666,284 B2 | 12/2003 | Stirm |
| 6,676,557 B2 | 1/2004 | Milbourne et al. |
| 6,683,396 B2 | 1/2004 | Ishida et al. |
| D486,049 S | 2/2004 | Sughura et al. |
| 6,688,406 B1 | 2/2004 | Wu et al. |
| 6,691,796 B1 | 2/2004 | Wu |
| 6,691,799 B2 | 2/2004 | Kuhnle et al. |
| 6,719,067 B2 | 4/2004 | Taga |
| 6,725,548 B1 | 4/2004 | Kramer et al. |
| 6,725,944 B2 | 4/2004 | Burger et al. |
| 6,729,812 B2 | 5/2004 | Yaksich et al. |
| D490,677 S | 6/2004 | Chung et al. |
| 6,776,244 B2 | 8/2004 | Milbourne |
| D496,573 S | 9/2004 | Cooper |
| D496,574 S | 9/2004 | Sakai et al. |
| 6,793,023 B2 | 9/2004 | Holzer et al. |
| 6,796,921 B1 | 9/2004 | Buck et al. |
| 6,805,207 B2 | 10/2004 | Hagan et al. |
| 6,814,158 B2 | 11/2004 | Bieber et al. |
| 6,848,985 B2 | 2/2005 | Lamprecht et al. |
| 6,857,338 B2 | 2/2005 | Tsergas |
| 6,860,341 B2 | 3/2005 | Spielmann et al. |
| 6,866,105 B2 | 3/2005 | Pfisterer et al. |
| 6,868,919 B1 | 3/2005 | Manschitz et al. |
| 6,886,643 B2 | 5/2005 | Riley et al. |
| 6,892,827 B2 | 5/2005 | Toyama et al. |
| 6,913,089 B2 | 7/2005 | Stirm |
| 6,913,090 B2 | 7/2005 | Droste et al. |
| 6,918,327 B2 | 7/2005 | Ayrton |
| 6,923,268 B2 | 8/2005 | Totsu |
| 6,949,309 B2 | 9/2005 | Moores, Jr. et al. |
| 6,957,706 B2 | 10/2005 | Burger et al. |
| 6,983,807 B2 | 1/2006 | Mayr et al. |
| 6,983,810 B2 * | 1/2006 | Hara et al. ............... 173/176 |
| 6,984,188 B2 | 1/2006 | Potter et al. |
| 7,000,709 B2 | 2/2006 | Milbourne |
| 7,004,357 B2 | 2/2006 | Shew |
| 7,008,151 B2 | 3/2006 | Yaksich et al. |
| 7,014,945 B2 | 3/2006 | Moores, Jr. et al. |
| 7,021,399 B2 | 4/2006 | Driessen |
| D521,388 S | 5/2006 | Wai |
| 7,036,608 B2 | 5/2006 | Garvey et al. |
| 7,044,882 B2 | 5/2006 | Eisenhardt |
| 7,048,107 B1 | 5/2006 | Geis et al. |
| 7,051,820 B2 | 5/2006 | Stirm |
| 7,056,616 B2 | 6/2006 | Moores, Jr. et al. |
| 7,066,691 B2 | 6/2006 | Doyle et al. |
| 7,073,605 B2 | 7/2006 | Saito et al. |
| 7,073,606 B2 | 7/2006 | Mamber et al. |
| 7,101,300 B2 | 9/2006 | Milbourne et al. |
| 7,121,359 B2 | 10/2006 | Frauhammer et al. |
| 7,124,839 B2 | 10/2006 | Furuta et al. |
| 7,131,503 B2 | 11/2006 | Furuta et al. |
| 7,134,509 B2 | 11/2006 | Rahm |
| 7,134,510 B2 | 11/2006 | Justis et al. |
| 7,156,402 B2 | 1/2007 | Mack |
| 7,166,939 B2 | 1/2007 | Voigt et al. |
| 7,174,969 B2 | 2/2007 | Droste |
| 7,213,659 B2 | 5/2007 | Saito et al. |
| 7,216,749 B2 | 5/2007 | Droste |
| 7,220,211 B2 | 5/2007 | Potter et al. |
| 7,223,195 B2 | 5/2007 | Milbourne et al. |
| 7,225,884 B2 | 6/2007 | Aeberhard |
| 7,264,065 B2 | 9/2007 | Simm et al. |
| 7,281,591 B2 | 10/2007 | Bone |
| 7,303,026 B2 | 12/2007 | Frauhammer et al. |
| 7,308,748 B2 | 12/2007 | Kokish |
| 7,314,097 B2 | 1/2008 | Jenner et al. |
| 7,404,781 B2 | 7/2008 | Milbourne et al. |
| 7,644,783 B2 * | 1/2010 | Roberts et al. ............... 173/178 |
| 2002/0033267 A1 | 3/2002 | Schweizer et al. |
| 2002/0096343 A1 | 7/2002 | Potter et al. |
| 2002/0146663 A1 | 10/2002 | Nakanishi et al. |
| 2003/0089511 A1 | 5/2003 | Tsuneda et al. |
| 2003/0102844 A1 | 6/2003 | Bailey |
| 2004/0051256 A1 | 3/2004 | Ayrton |
| 2004/0056539 A1 | 3/2004 | Du |
| 2004/0134673 A1 | 7/2004 | Droste |
| 2004/0139835 A1 | 7/2004 | Wright et al. |
| 2004/0156190 A1 | 8/2004 | Tsuruta et al. |
| 2004/0157698 A1 | 8/2004 | Hara et al. |
| 2004/0206524 A1 | 10/2004 | Rahm |
| 2004/0211575 A1 | 10/2004 | Soika et al. |
| 2004/0211576 A1 | 10/2004 | Milbourne et al. |
| 2004/0226731 A1 | 11/2004 | Faatz et al. |
| 2004/0263008 A1 | 12/2004 | Voigt et al. |
| 2005/0015636 A1 | 1/2005 | Chen et al. |
| 2005/0022358 A1 | 2/2005 | Hagan et al. |
| 2005/0025586 A1 | 2/2005 | Mikiya et al. |
| 2005/0028996 A1 | 2/2005 | Toukairin et al. |
| 2005/0028997 A1 | 2/2005 | Hagan et al. |
| 2005/0061524 A1 | 3/2005 | Hagan et al. |
| 2005/0087353 A1 | 4/2005 | Oki et al. |
| 2005/0093251 A1 | 5/2005 | Buchholz et al. |
| 2005/0150669 A1 | 7/2005 | Umemura et al. |
| 2005/0153636 A1 | 7/2005 | Numata et al. |
| 2005/0161241 A1 | 7/2005 | Frauhammer et al. |
| 2005/0194164 A1 | 9/2005 | Saito et al. |
| 2005/0194165 A1 | 9/2005 | Saito et al. |
| 2005/0199404 A1 | 9/2005 | Furuta et al. |
| 2005/0218186 A1 | 10/2005 | Forster |
| 2005/0224242 A1 | 10/2005 | Britz et al. |
| 2005/0247459 A1 | 11/2005 | Voigt et al. |
| 2005/0257944 A1 | 11/2005 | Cooper |
| 2005/0257945 A1 | 11/2005 | Justis et al. |
| 2005/0271489 A1 | 12/2005 | Gensmann et al. |
| 2005/0279517 A1 | 12/2005 | Hoffman et al. |
| 2005/0284648 A1 | 12/2005 | Frauhammer et al. |
| 2006/0021771 A1 | 2/2006 | Milbourne et al. |
| 2006/0027978 A1 | 2/2006 | Young et al. |
| 2006/0048959 A1 | 3/2006 | Sakai et al. |
| 2006/0061048 A1 | 3/2006 | Puzio et al. |
| 2006/0061049 A1 | 3/2006 | Zhang et al. |
| 2006/0086514 A1 | 4/2006 | Aeberhard |
| 2006/0086517 A1 | 4/2006 | Bone |
| 2006/0090913 A1 | 5/2006 | Furuta |
| 2006/0096771 A1 | 5/2006 | Brotto |
| 2006/0102364 A1 | 5/2006 | Yung |
| 2006/0104735 A1 | 5/2006 | Zeller et al. |
| 2006/0113092 A1 | 6/2006 | Simm et al. |
| 2006/0113097 A1 | 6/2006 | Simm et al. |
| 2006/0141915 A1 | 6/2006 | Walstrom et al. |
| 2006/0144602 A1 | 7/2006 | Arich et al. |
| 2006/0159577 A1 | 7/2006 | Soika et al. |
| 2006/0175915 A1 | 8/2006 | Voigt et al. |
| 2006/0180327 A1 | 8/2006 | Nagasaka et al. |
| 2006/0185866 A1 | 8/2006 | Jung et al. |
| 2006/0207775 A1 * | 9/2006 | Armstrong ............... 173/1 |
| 2006/0222930 A1 | 10/2006 | Aradachi et al. |
| 2006/0232021 A1 | 10/2006 | Schell et al. |
| 2006/0233618 A1 | 10/2006 | Puzio et al. |
| 2006/0233621 A1 | 10/2006 | Schell et al. |
| 2006/0244223 A1 | 11/2006 | Zhon et al. |
| 2006/0244224 A1 | 11/2006 | Zhon et al. |
| 2007/0080507 A1 | 4/2007 | Aeberhard et al. |

| | | | | | | |
|---|---|---|---|---|---|---|
| 2007/0137875 | A1 | 6/2007 | Spielmann | DE | 102 59 372 | 7/2004 |
| 2008/0090504 | A1 | 4/2008 | Trautner et al. | DE | 10337260 | 3/2005 |
| 2008/0265695 | A1 | 10/2008 | Yoshida et al. | DE | 103 36 637 | 4/2005 |
| 2008/0296036 | A1 | 12/2008 | Simm et al. | DE | 103 46 534 | 5/2005 |
| 2009/0021090 | A1 | 1/2009 | Du et al. | DE | 10358032 | 7/2005 |

FOREIGN PATENT DOCUMENTS

| | | | | | |
|---|---|---|---|---|---|
| DE | 102004003711 | 8/2005 |
| DE | 20 2005 015 311 | 1/2006 |
| DE | 677216 | 6/1939 | DE | 10 2006 009 922 | 3/2006 |
| DE | 1893786 | 5/1964 | DE | 10 2004 052 329 | 5/2006 |
| DE | 6925128 | 10/1969 | DE | 102004027635 | 6/2006 |
| DE | 1935308 | 1/1970 | DE | 10 2005 041 447 | 3/2007 |
| DE | 6948878 U | 5/1970 | EP | 0018626 | 11/1980 |
| DE | 2 029 614 | 6/1970 | EP | 0023233 | 2/1981 |
| DE | 2129771 | 12/1972 | EP | 0031433 | 7/1981 |
| DE | 25 11 469 | 3/1975 | EP | 0031867 | 7/1981 |
| DE | 25 11 469 | 9/1976 | EP | 040261 | 11/1981 |
| DE | 2522446 | 12/1976 | EP | 0040261 | 11/1981 |
| DE | 27 51 506 | 5/1979 | EP | 094281 | 11/1983 |
| DE | 28 30 511 | 1/1980 | EP | 0302229 | 2/1989 |
| DE | 30 41 009 | 10/1980 | EP | 0 399 714 | 11/1990 |
| DE | 2914883 | 10/1980 | EP | 0416612 | 3/1991 |
| DE | 2918415 | 11/1980 | EP | 0 463 416 | 6/1991 |
| DE | 2931520 | 2/1981 | EP | 0 566 926 | 10/1993 |
| DE | 2941356 | 4/1981 | EP | 0600854 | 6/1994 |
| DE | 30 41 994 | 5/1982 | EP | 0612588 | 8/1994 |
| DE | 32 39 985 | 10/1982 | EP | 0 345 896 | 9/1994 |
| DE | 81 02 453 | 10/1982 | EP | 0613758 | 9/1994 |
| DE | 3136149 | 3/1983 | EP | 0 623 427 | 11/1994 |
| DE | 31 47 501 | 6/1983 | EP | 0698449 | 2/1996 |
| DE | 32 15 734 | 11/1983 | EP | 0 706 861 | 4/1996 |
| DE | 33 16 111 | 11/1983 | EP | 0716896 | 6/1996 |
| DE | 83 19 187 | 11/1983 | EP | 0734116 | 9/1996 |
| DE | 32 20 795 | 12/1983 | EP | 792 724 | 1/1997 |
| DE | 3220795 | 12/1983 | EP | 0755755 | 1/1997 |
| DE | 3240530 | 5/1984 | EP | 0 761 350 | 3/1997 |
| DE | 3318199 | 11/1984 | EP | 0775555 | 5/1997 |
| DE | 33 24 333 | 1/1985 | EP | 0 794 038 | 9/1997 |
| DE | 3340799 | 5/1985 | EP | 0792723 | 9/1997 |
| DE | 34 30 023 | 2/1986 | EP | 0792724 | 9/1997 |
| DE | 34 36 220 | 4/1986 | EP | 0808011 | 11/1997 |
| DE | 3614511 | 11/1986 | EP | 0856383 | 8/1998 |
| DE | 3527971 | 3/1987 | EP | 0905850 | 3/1999 |
| DE | 3610671 | 10/1987 | EP | 0909614 | 4/1999 |
| DE | 8436564 | 12/1987 | EP | 1083029 | 3/2001 |
| DE | 3636301 | 4/1988 | EP | 1 114 700 | 7/2001 |
| DE | 36 43 422 | 6/1988 | EP | 1364752 | 11/2003 |
| DE | 90 16 415 | 9/1991 | EP | 1 413 402 | 4/2004 |
| DE | 30 18 633 | 11/1991 | EP | 1477280 | 11/2004 |
| DE | 40 16 593 | 11/1991 | EP | 1 481 768 | 12/2004 |
| DE | 4211316 | 10/1993 | EP | 1506846 | 2/2005 |
| DE | 42 25 157 | 2/1994 | EP | 1207982 | 3/2005 |
| DE | 43 05 965 | 9/1994 | EP | 1 555 091 | 7/2005 |
| DE | 44 06 841 | 4/1995 | EP | 1555091 | 7/2005 |
| DE | 4334933 | 4/1995 | EP | 1 563 960 | 8/2005 |
| DE | 4401664 | 7/1995 | EP | 1 695 796 | 2/2006 |
| DE | 196 21 090 | 12/1996 | EP | 1 637 290 | 3/2006 |
| DE | 195 28 924 | 2/1997 | EP | 1 652 630 | 5/2006 |
| DE | 297 01 358 | 5/1997 | EP | 1 655 110 | 5/2006 |
| DE | 297 03 469 | 6/1997 | EP | 1652630 | 5/2006 |
| DE | 19715016 | 10/1998 | EP | 1250217 | 6/2006 |
| DE | 197 53 304 | 6/1999 | EP | 1666905 | 6/2006 |
| DE | 19803454 | 8/1999 | EP | 1 690 637 | 8/2006 |
| DE | 19942271 | 9/1999 | EP | 1 716 951 | 11/2006 |
| DE | 100 06 641 | 9/2000 | FR | 2 526 348 | 11/1983 |
| DE | 19908300 | 9/2000 | GB | 1 315 904 | 5/1973 |
| DE | 10060635 | 7/2001 | GB | 1438571 | 8/1973 |
| DE | 100 37 808 | 2/2002 | GB | 2085345 | 4/1982 |
| DE | 201 14 999 | 2/2002 | GB | 2109739 | 6/1983 |
| DE | 20102674 | 8/2002 | GB | 2115337 | 9/1983 |
| DE | 10228452 | 1/2004 | GB | 2283378 | 5/1995 |
| DE | 102 40 361 | 3/2004 | GB | 2285003 | 6/1995 |
| DE | 102 58 605 | 7/2004 | GB | 2285764 | 7/1995 |
| | | | GB | 2327054 | 1/1999 |

| | | |
|---|---|---|
| GB | 2 334 911 | 2/1999 |
| GB | 2353243 | 2/2001 |
| GB | 2404891 | 2/2005 |
| GB | 2413105 | 10/2005 |
| GB | 2415656 | 1/2006 |
| GB | 2420522 | 5/2006 |
| JP | 59-124507 | 7/1984 |
| JP | 60076913 | 5/1985 |
| JP | 61-131807 | 6/1986 |
| JP | 62182725 | 8/1987 |
| JP | 62-10507 | 8/1994 |
| JP | 7040257 | 2/1995 |
| JP | 09-011158 | 1/1997 |
| JP | 9109044 | 4/1997 |
| JP | 11-267937 | 10/1999 |
| JP | 1059635 | 2/2000 |
| JP | 996941 | 11/2000 |
| JP | 1092226 | 11/2000 |
| JP | 1109601 | 5/2001 |
| JP | 2002144210 | 5/2002 |
| JP | 2002-254356 | 9/2002 |
| JP | 1158192 | 11/2002 |
| JP | 1172513 | 5/2003 |
| JP | 1238857 | 5/2005 |
| JP | 1255291 | 11/2005 |
| WO | WO 93/15863 | 8/1993 |
| WO | WO 95/00288 | 1/1995 |
| WO | WO 95/01240 | 1/1995 |
| WO | WO 96/08065 | 3/1996 |
| WO | WO 96/19677 | 6/1996 |
| WO | WO 97/27020 | 7/1997 |
| WO | WO 98/05457 | 2/1998 |
| WO | WO 99/04933 | 2/1999 |
| WO | WO 99/10132 | 3/1999 |
| WO | WO 99/53804 | 10/1999 |
| WO | WO 03/033203 | 4/2003 |
| WO | WO 2005/011904 | 2/2005 |
| WO | WO 2005/040627 | 5/2005 |
| WO | 2007/101735 | 9/2007 |

OTHER PUBLICATIONS

Non-Final Office Action, copending U.S. Appl. No. 11/986,688, mailed Jun. 10, 2009.
Extended European Search Report EP Patent Application No. 08169623.9 corresponding to U.S. Appl. No. 11/986,686 dated Mar. 25, 2009 (citing DE 102006009922, EP1695796, EP1652630, GB2285764, US5004054, US5343961, and US6868919).
Extended European Search Report EP Patent Application No. 0816595.9 corresponding to U.S. Appl. No. 11/986,688 dated Mar. 30, 2009 (citing DE2029614, DE2511469, DE2830511, FR2526348, GB2285764, US3998278, US4158313, and US5004054).
Non-Final Office Action, copending U.S. Appl. No. 11/986,678, mailed Jul. 23, 2009.
Non-Final Office Action, copending U.S. Appl. No. 11/986,678, mailed Jan. 14, 2009.
Non-Final Office Action, copending U.S. Appl. No. 11/986,668, mailed May 11, 2009.
Non-Final Office Action, copending U.S. Appl. No. 11/986,685, mailed May 27, 2009.
Final Office Action in copending U.S. Appl. No. 11/986,669, mailed Feb. 3, 2010.
Final Office Action in copending U.S. Appl. No. 11/986,668, mailed Nov. 30, 2009.
Final Office Action in copending U.S. Appl. No. 11/986,688, mailed Dec. 30, 2009.
Non-Final Office Action in copending U.S. Appl. No. 11/986,686, mailed Sep. 17, 2009.

* cited by examiner

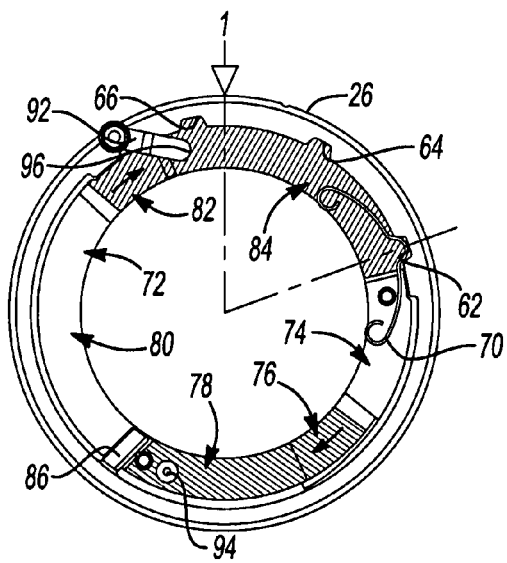
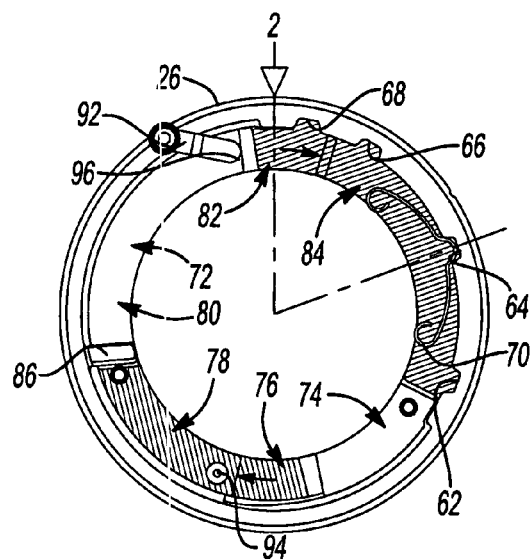
Fig-6
Fig-7
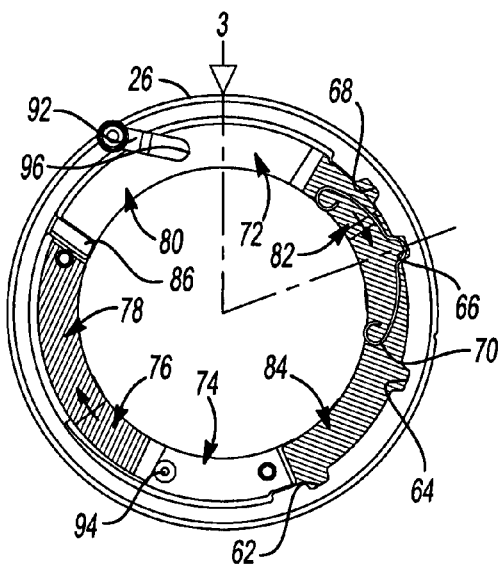
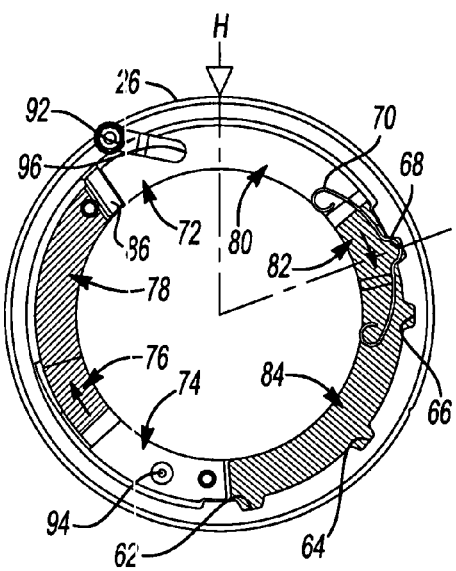
Fig-8
Fig-9

MULTI-SPEED DRILL AND TRANSMISSION WITH LOW GEAR ONLY CLUTCH

FIELD

The present disclosure relates to a multi-speed drill, and more particularly to a multi-speed drill with a parallel axis transmission and an overload clutch.

BACKGROUND

The statements in this section merely provide background information related to the present disclosure and may not constitute prior art.

Multi-speed drills can include a transmission for transferring torque between an input member and an output spindle. The transmission can be a parallel axis transmission including a low speed gear and a high speed gear. These transmissions can selectively couple the input member to the output through the low speed gear or the high speed gear. Some multi-speed drills can include a clutch for limiting the amount of torque transferred between the driven input member and the output spindle.

SUMMARY

A parallel axis transmission for a multi-speed drill for torque transfer between at least one pinion and an output spindle includes a high speed gear mounted on the output spindle. A low speed gear is also mounted on the output spindle. A clutch member is operably coupled to the low speed gear to transfer torque between the at least one pinion and the output spindle up to a predetermined torque level at the output spindle. When a torque between the clutch member and the low output gear exceeds the predetermined torque level, the clutch member becomes uncoupled from the low speed gear. A shift assembly is operable to selectively change between a plurality of modes. The plurality of modes include a low speed mode for torque transfer between the at least one pinion and the output spindle via the low speed gear and the clutch member; and a high speed mode for torque transfer between the at least one pinion and the output spindle via the high speed gear so as to bypass the clutch member.

A multi-speed drill includes at least one pinion and an output spindle. A high speed gear is mounted on the output spindle and operable to selectively transfer torque between the at least one pinion and the output spindle. A low speed gear is mounted on the output spindle and operable to selectively transfer torque between the at least one pinion and the output spindle. A clutch member is operably coupled to the low speed gear to transfer torque between the at least one pinion and the output spindle up to a predetermined torque level at the output spindle. When a torque between the clutch member and the low output gear exceeds the predetermined torque level, the clutch member becomes uncoupled from the low speed gear. A shift assembly is provided to selectively change between a plurality of modes. The plurality of modes include a low speed mode for torque transfer between the at least one pinion and the output spindle via the low output gear and the clutch member; and a high speed mode for torque transfer between the at least one pinion and the output spindle via the high output gear so as to bypass the clutch member.

A multi-speed drill includes a motor, an output spindle, and a first input pinion mounted on a secondary shaft that is driven for rotation by the motor. A second input pinion is mounted on the secondary shaft. A high speed gear is mounted on the output spindle and in constant meshing engagement with the second input pinion and operable to selectively transfer torque between the at least one pinion and the output spindle. A low speed gear is mounted on the output spindle and in constant meshing engagement with the first input pinion. The low speed gear comprising at least one gear cam surface. A clutch member is fixed to the output spindle. The clutch member comprising at least one clutch cam surface configured to cooperate with the at least one gear cam surface. A biasing member biases the low speed gear axially toward the clutch member along the output spindle such that the at least one gear cam surface and the at least one clutch cam surface cooperate with each other to transfer torque transfer between the first input pinion and the output spindle. The at least one gear cam surface and the at least one clutch cam surface cam against each other to thereby move the low output gear away from the clutch member against a biasing force of the biasing member when torque between the clutch member and the low output gear exceeds a predetermined torque level. A shift assembly for selectively changing between a plurality of modes is provided. The plurality of modes includes a low speed mode for torque transfer between the first input pinion and the output spindle via the low output gear and the clutch member; and a high speed mode for torque transfer between the second input pinion and the output spindle via the high output gear so as to bypass the clutch member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a rear view of the mode collar shown in a first mode corresponding to an electronic low speed;

FIG. 7 is a rear view of the mode collar shown in a second mode corresponding to a mechanical low speed;

FIG. 8 is a rear view of the mode collar shown in a third mode corresponding to a mechanical high speed;

FIG. 9 is a rear view of the mode collar shown in a fourth mode corresponding to a mechanical high speed and hammer mode;

Figure 20:
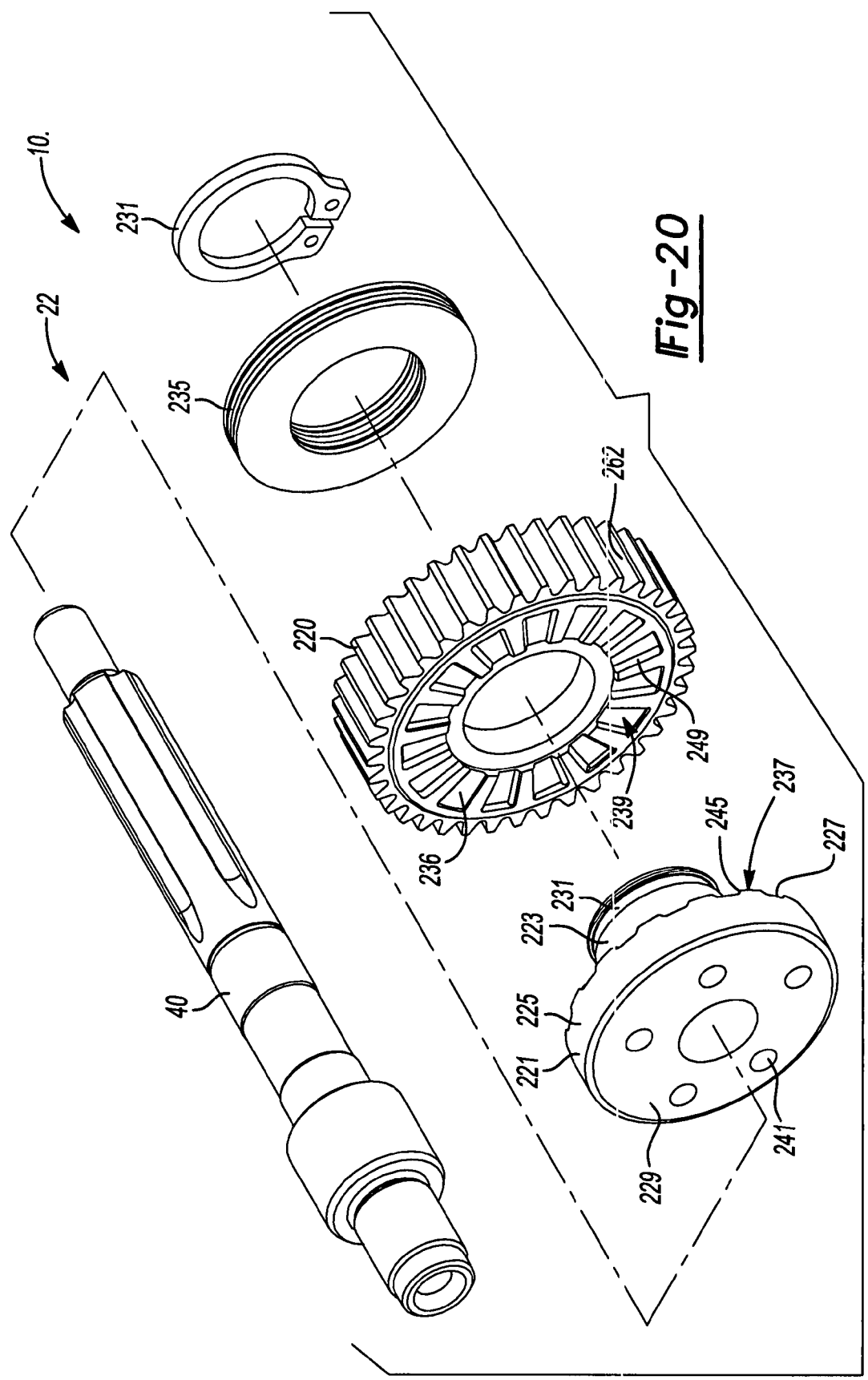
FIG. 20 is an exploded view of a portion of a transmission of the hammer-drill.
Figure 23:
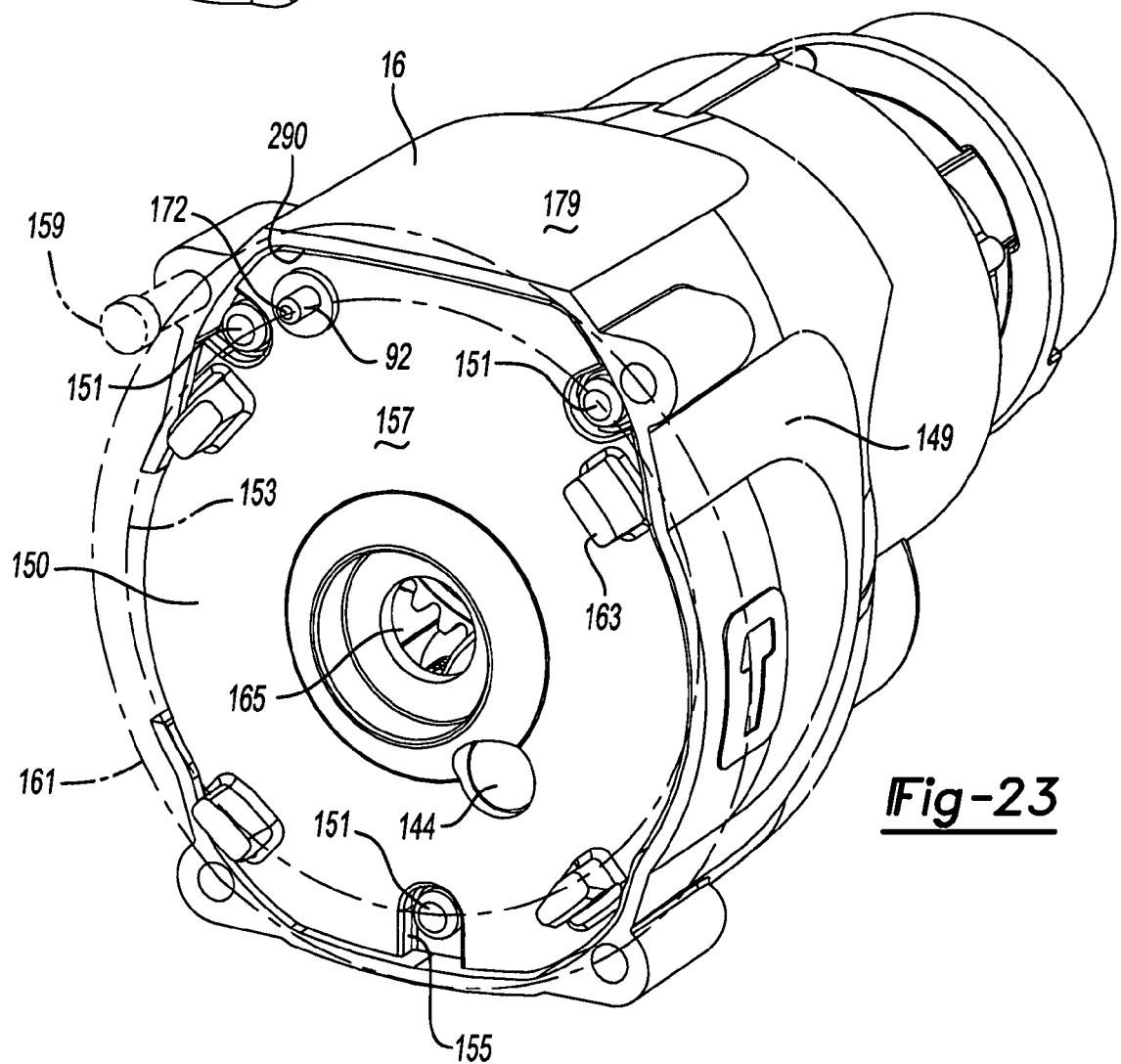
Figure 22:
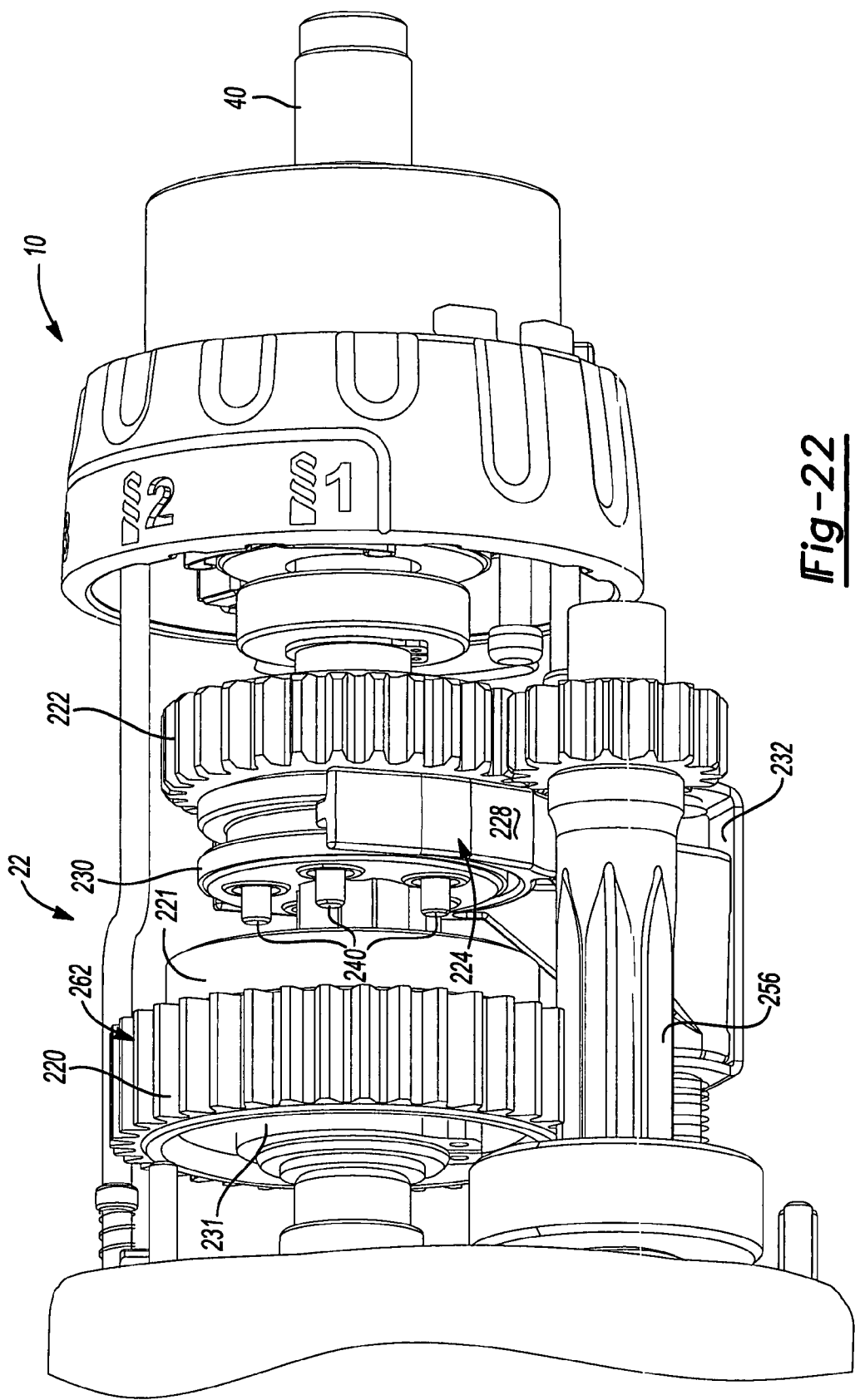
Figure 24:
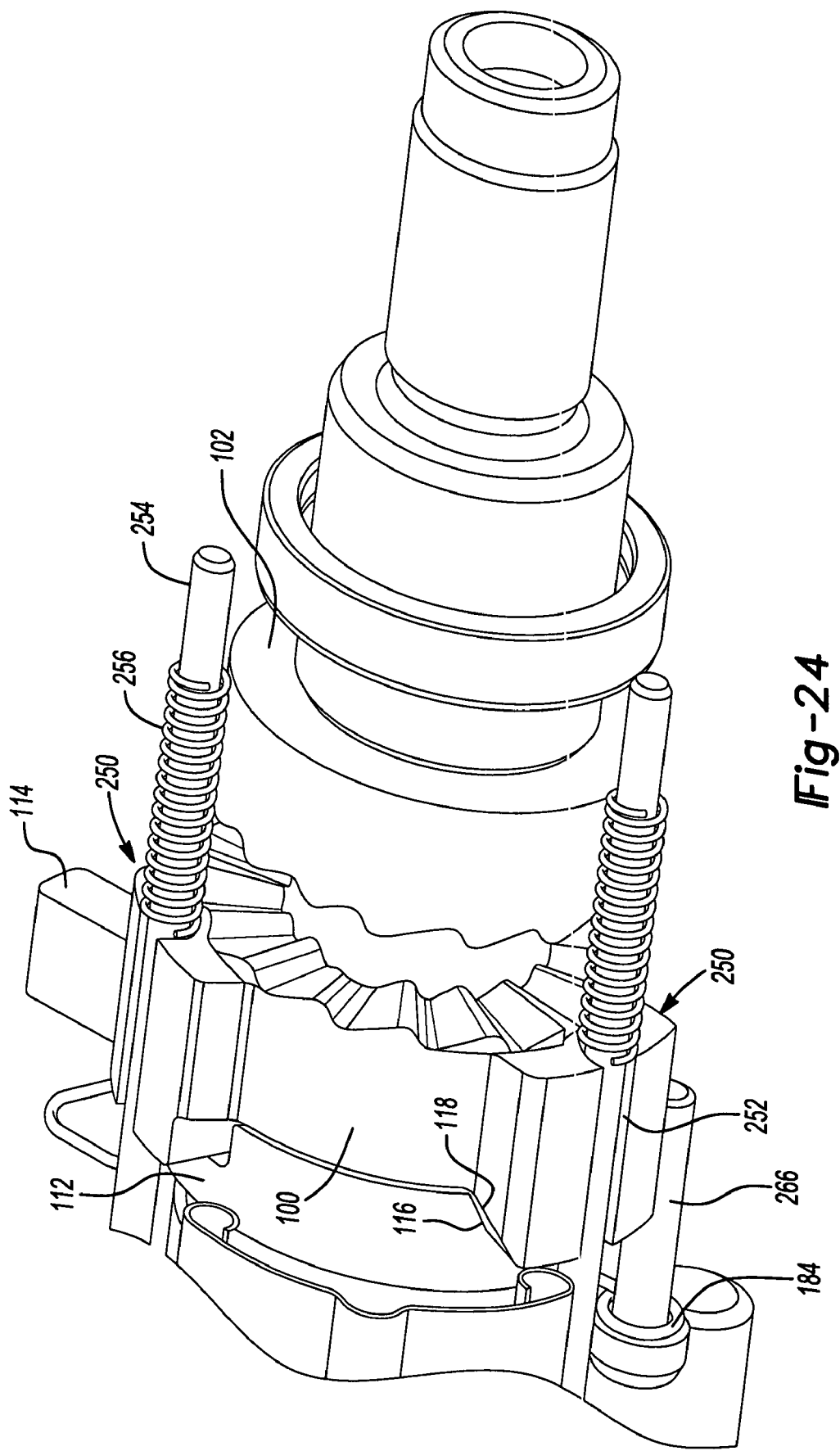
Figure 25:
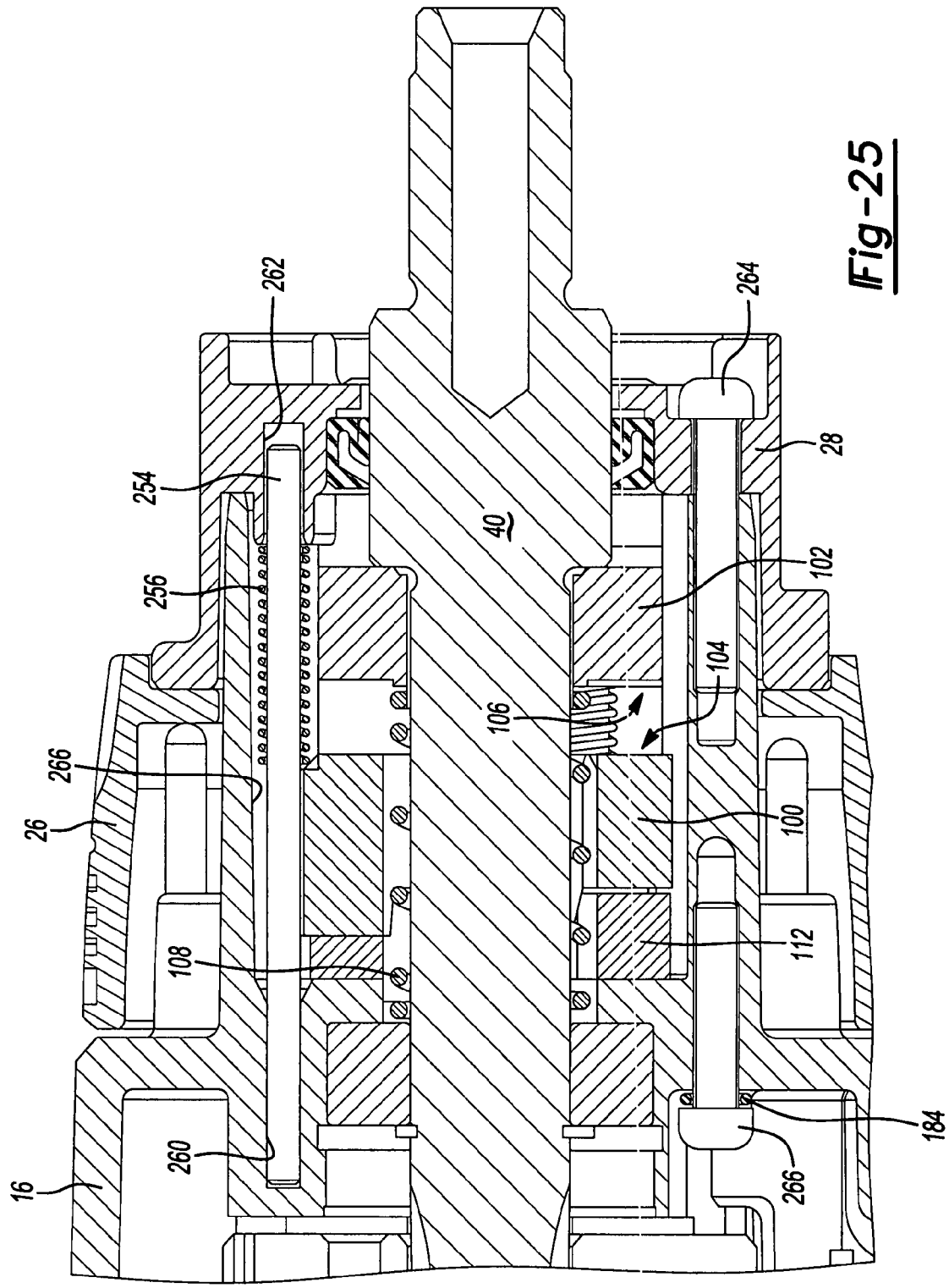
Figure 26:
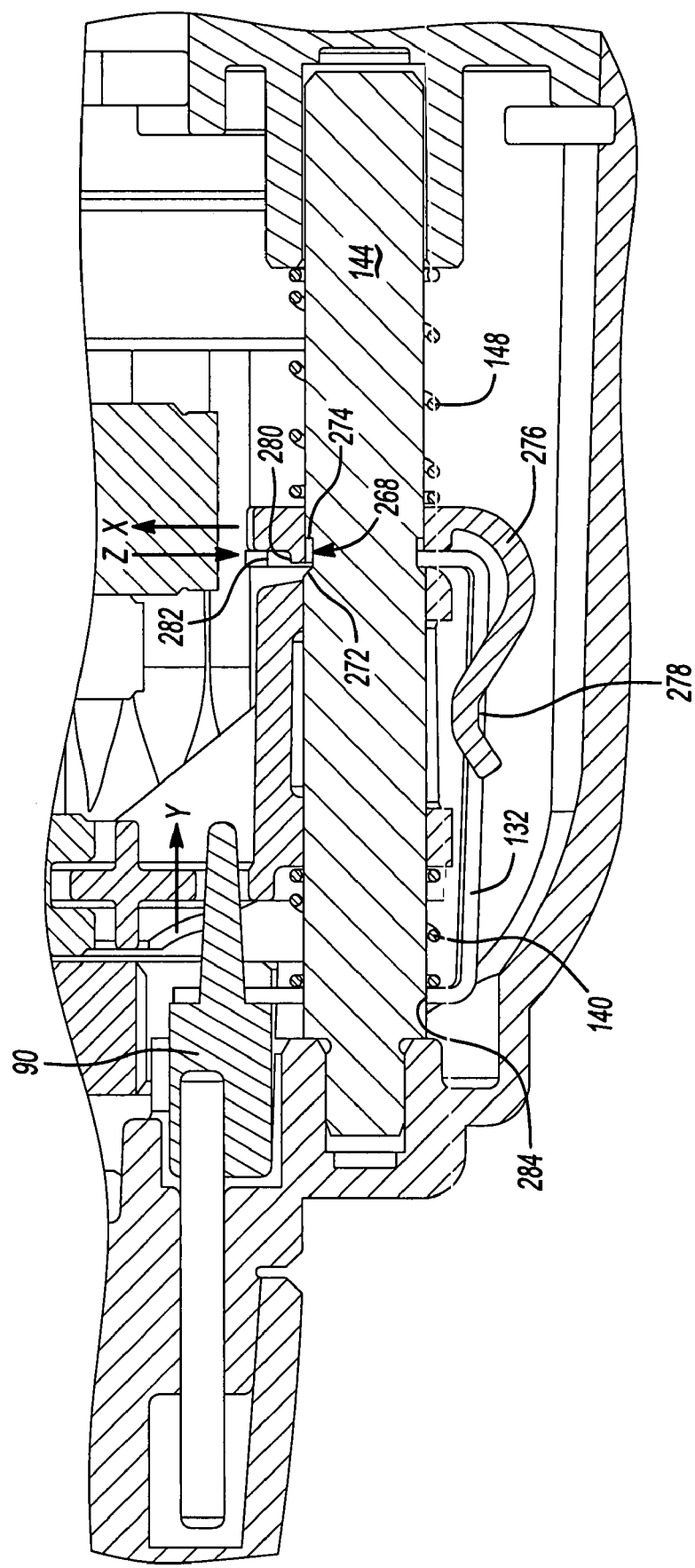

FIG. 22. is a perspective view of the transmission of the hammer-drill of FIG. 20 according to the present teachings;

FIG. 23 is a perspective view of the forward case of the hammer-drill in accordance with teachings of the present disclosure;

FIG. 24 is a partial perspective view of various hammer mechanism components;

FIG. 25 is a partial cross-section view of various hammer mechanism and housing components; and FIG. 26 is a partial cross-section view of various shift locking member components.

DETAILED DESCRIPTION

Figure 1:
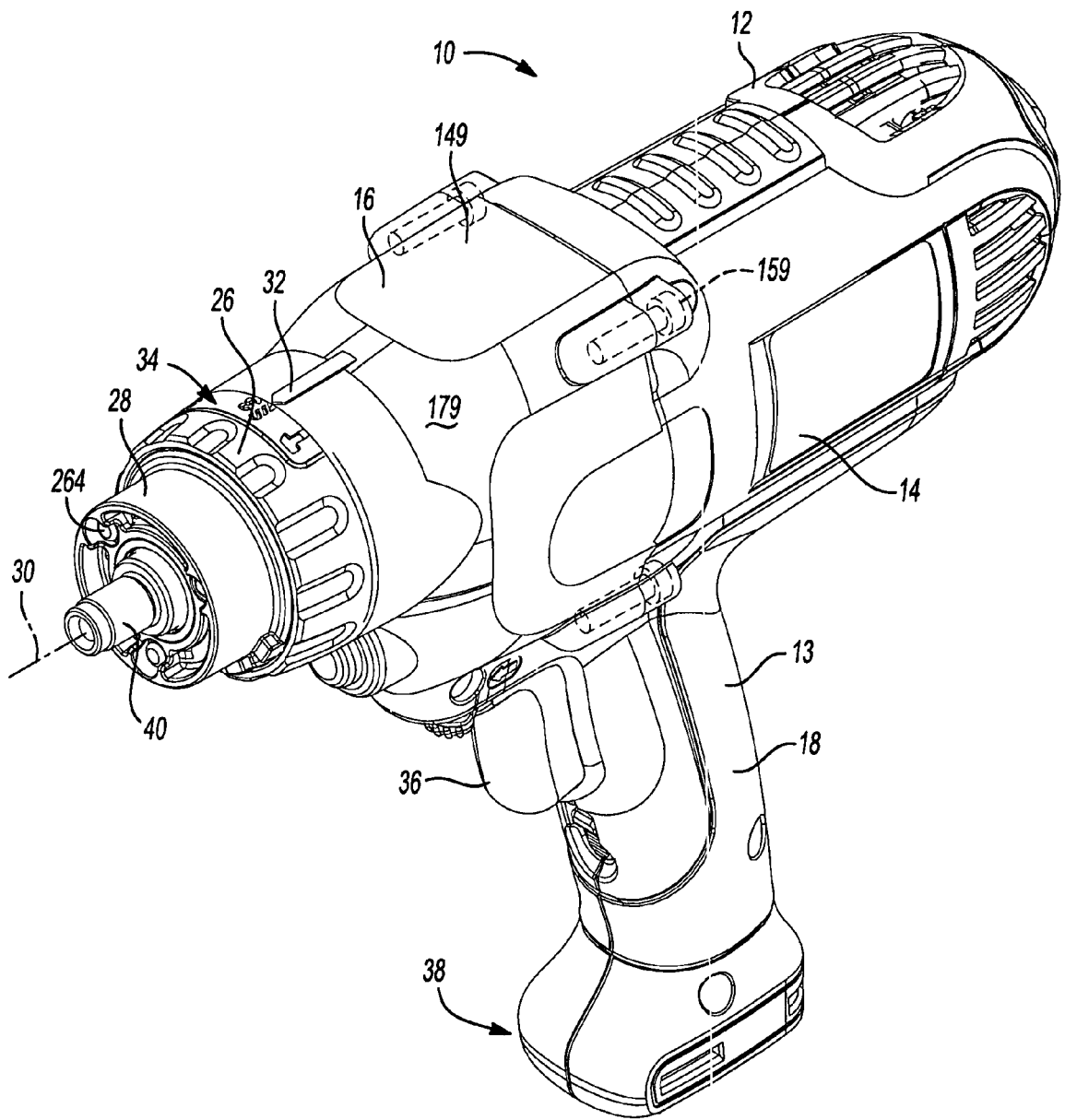
FIG. 1 is a perspective view of an exemplary multi-speed hammer-drill constructed in accordance with the teachings of the present disclosure.
Figure 2:
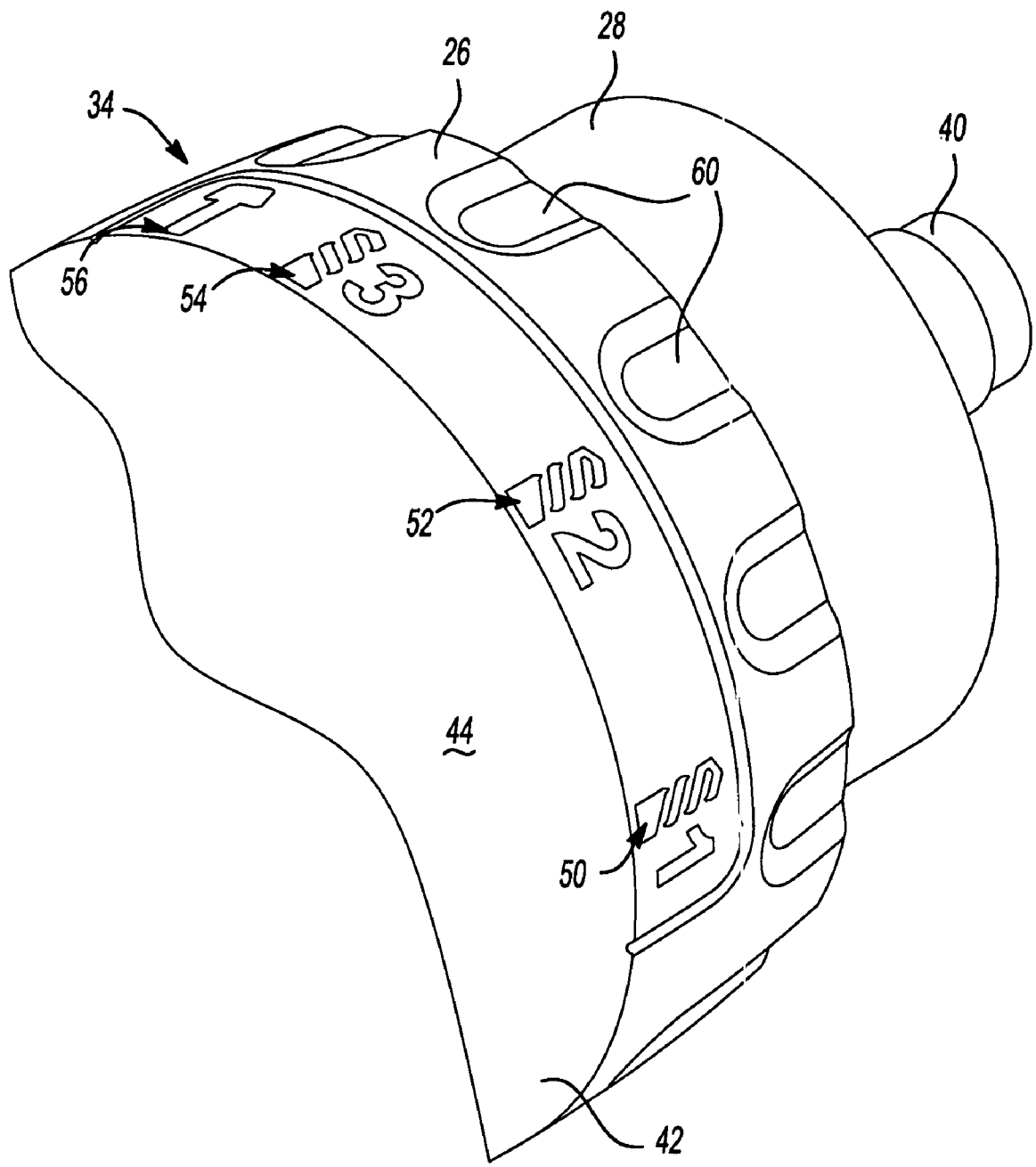
FIG. 2 is partial perspective view of a distal end of the hammer-drill of FIG. 1 including a mode collar constructed in accordance with the teachings of the present disclosure.
Figure 3:
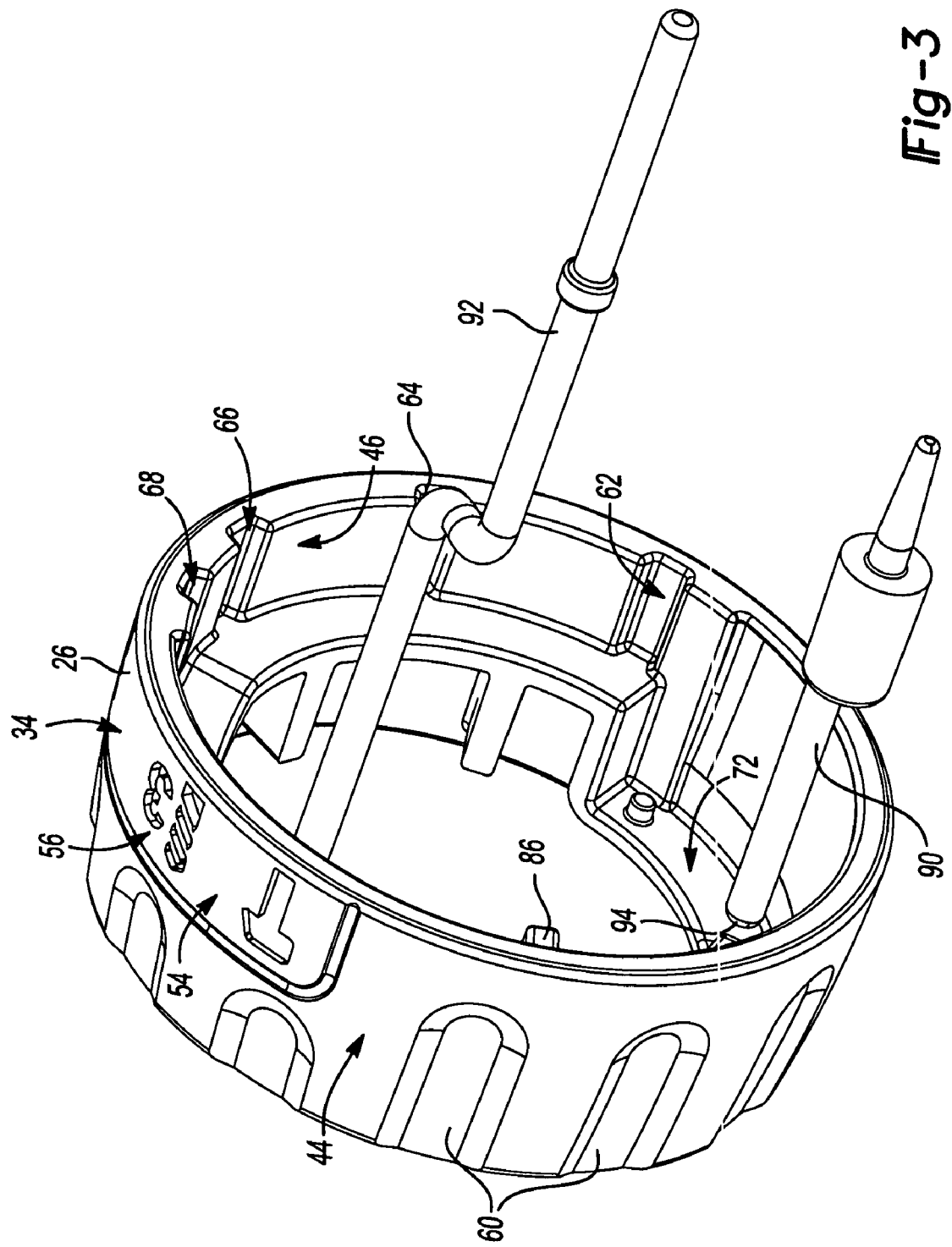
FIG. 3 is a rear perspective view of the mode collar illustrated in FIG. 2 including an electronic speed shift pin and a mechanical speed shift pin.

With initial reference to FIG. 1, an exemplary hammer-drill constructed in accordance with the present teachings is shown and generally identified at reference numeral 10. The hammer-drill 10 can include a housing 12 having a handle 13. The housing 12 generally comprising a rearward housing 14, a forward housing 16 and a handle housing 18. These housing portions 14, 16, and 13 can be separate components or combined in various manners. For example, the handle housing 18 can be combed as part of a single integral component forming at least some portion of the rearward housing 14.

Figure 11:
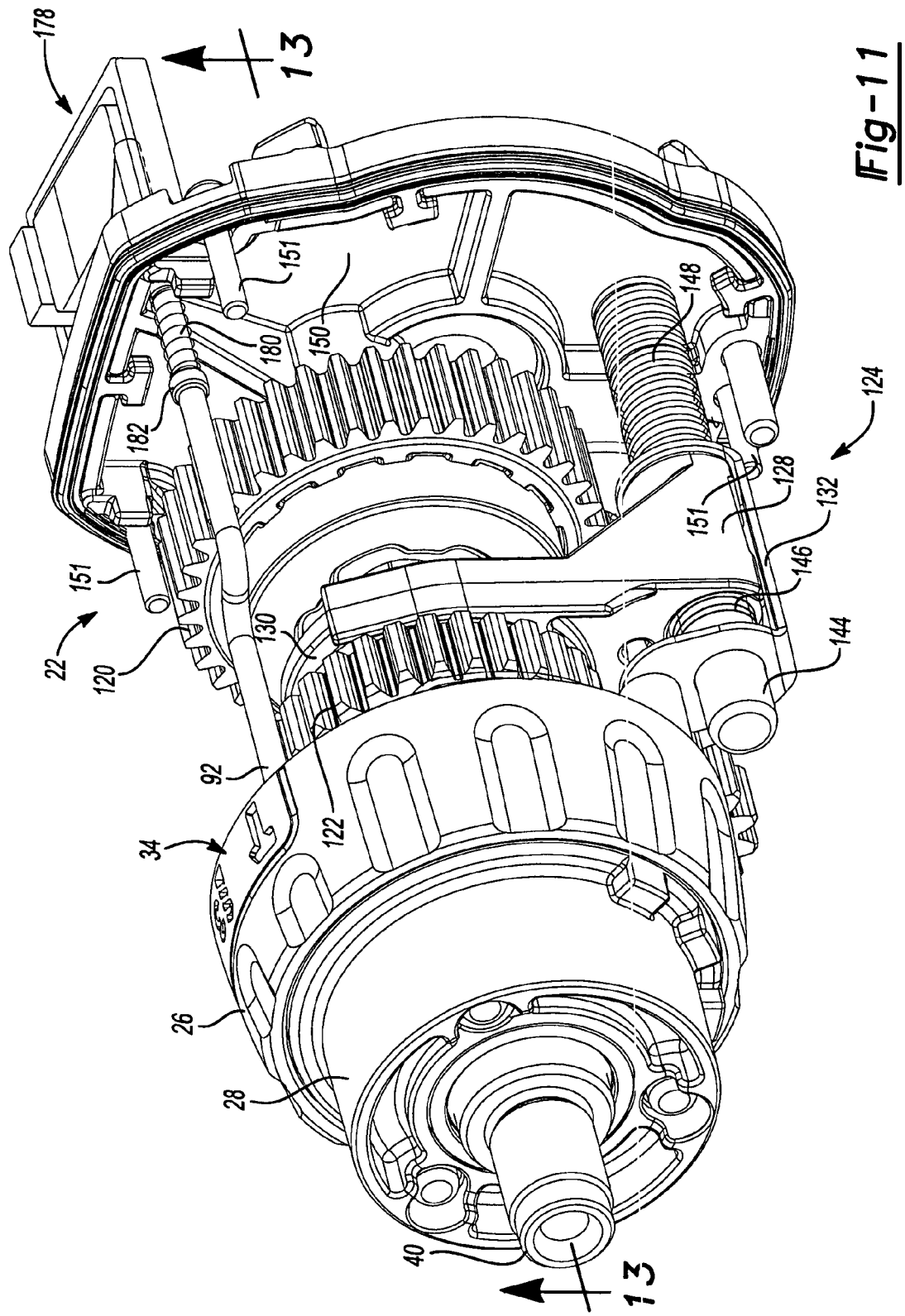
FIG. 11 is a front perspective view of the mode collar and transmission of the hammer-drill of FIG. 1 illustrating a shift fork according to the present teachings.

In general, the rearward housing 14 covers a motor 20 (FIG. 18) and the forward housing 16 covers a transmission 22 (FIG. 11). A mode collar 26 is rotatably disposed around the forward housing 16 and an end cap 28 is arranged adjacent the mode collar 26. As will be described in greater detail herein, the mode collar 26 is selectively rotatable between a plurality of positions about an axis 30 that substantially corresponds to the axis of a floating rotary-reciprocatory output spindle 40. The mode collar 26 is disposed around the output spindle 40 and may be concentrically or eccentrically mounted around the output spindle 40. Each rotary position of the mode collar 26 corresponds to a mode of operation. An indicator 32 is disposed on the forward housing 16 for aligning with a selected mode identified by indicia 34 provided on the mode collar 26. A trigger 36 for activating the motor 20 can be disposed on the housing 12 for example on the handle 13. The hammer-drill 10 according to this disclosure is an electric system having a battery (not shown) removably coupled to a base 38 of the handle housing 18. It is appreciated, however, that the hammer-drill 10 can be powered with other energy sources, such as AC power, pneumatically based power supplies and/or combustion based power supplies, for example.

The output spindle 40 can be a floating rotary-reciprocatory output spindle journaled in the housing 12. The output spindle 40 is driven by the motor 20 (FIG. 20) through the transmission 22 (FIG. 11). The output spindle 40 extends forwardly beyond the front of the forward housing 16. A chuck (not shown) can be mounted on the output spindle 40 for retaining a drill bit (or other suitable implement) therein.

Turning now to FIGS. 2-9, the mode collar 26 will be described in greater detail. The mode collar 26 generally defines a cylindrical body 42 having an outboard surface 44 and an inboard surface 46. The outboard surface 44 defines the indicia 34 thereon. The indicia 34 correspond to a plurality of modes of operation. In the example shown (see FIG. 2), the indicia 34 includes the numerals "1", "2", "3", and drill and "hammer" icons. Prior to discussing the specific operation of the hammer-drill 10, a brief description of each of these exemplary modes is warranted. The mode "1" generally identified at reference 50 corresponds to an electronic low speed drilling mode. The mode "2" generally identified at reference 52 corresponds to a mechanical low speed mode. The mode "3" generally identified at reference 54 corresponds to a mechanical high speed mode. The "hammer-drill" mode generally identified at reference 56 corresponds to a hammer-drill mode. As will become appreciated, these modes are exemplary and may additionally or alternatively comprise other modes of operation. The outboard surface 44 of the mode collar 26 can define ribs 60 for facilitating a gripping action.

The inboard surface 46 of the mode collar 26 can define a plurality of pockets therearound. In the example shown, four pockets 62, 64, 66, and 68, respectively (FIG. 4), are defined around the inboard surface 46 of the mode collar 26. A locating spring 70 (FIGS. 6-9) partially nests into one of the plurality of pockets 62, 64, 66, and 68 at each of the respective modes. As a result, the mode collar 26 can positively locate at each of the respective modes and provide feedback to a user that a desired mode has been properly selected. A cam surface 72 extends generally circumferentially around the inboard surface 46 of the mode collar 26. The cam surface 72 defines a mechanical shift pin valley 74, a mechanical shift pin ramp 76, a mechanical shift pin plateau 78, an electronic shift pin valley 80, an electronic shift pin ramp 82, an electronic shift pin plateau 84, and a hammer cam drive rib 86.

With specific reference now to FIGS. 3 and 6-9, the mode collar 26 communicates with a mechanical speed shift pin 90 and an electronic speed shift pin 92. More specifically, a distal tip 94 (FIG. 3) of the mechanical speed shift pin 90 and a distal tip 96 of the electronic speed shift pin 92, respectively, each ride across the cam surface 72 of the mode collar 26 upon rotation of the mode collar 26 about the axis 30 (FIG. 1) by the user. FIG. 6 illustrates the cam surface 72 of the mode collar 26 in mode "1". In mode "1", the distal tip 96 of the electronic speed shift pin 92 locates at the electronic shift pin plateau 84. Concurrently, the distal tip 94 of the mechanical speed shift pin 90 locates at the mechanical shift pin plateau 78.

FIG. 7 illustrates the cam surface 72 of the mode collar 26 in mode "2". In mode "2", the distal tip 96 of the electronic speed shift pin 92 locates on the electronic shift pin valley 80, while the distal tip 94 of the mechanical speed shift pin 90 remains on the mechanical shift pin plateau 78. FIG. 7 illustrates the dial 72 of the mode collar 26 in mode "3". In mode "3", the distal tip 96 of the electronic speed shift pin 92 locates on the electronic shift pin valley 80, while the distal tip 94 of the mechanical speed shift pin 90 locates on the mechanical shift pin valley 74. In the "hammer-drill" mode, the distal tip 96 of the electronic speed shift pin 92 locates on the electronic shift pin valley 80, while the distal tip 94 of the mechanical speed shift pin 90 locates on the mechanical shift pin valley 74. Of note, the distal tips 96 and 94 of the electronic speed shift pin 92 and the mechanical speed shift pin 90, respectively, remain on the same surfaces (i.e., without elevation change) between the mode "3" and the "hammer-drill" mode.

As can be appreciated, the respective ramps 76 and 82 facilitate transition between the respective valleys 74 and 80 and plateaus 78 and 84. As will become more fully appreciated from the following discussion, movement of the distal tip 96 of the electronic speed shift pin 92 between the electronic shift pin valley 80 and plateau 84 influences axial translation of the electronic speed shift pin 92. Likewise, movement of the distal tip 94 of the mechanical speed shift pin 90 between the mechanical shift pin valley 74 and plateau 78 influences axial translation of the mechanical speed shift pin 90.

Turning now to FIGS. 10, 13-17, the hammer-drill 10 will be further described. The hammer-drill 10 includes a pair of cooperating hammer members 100 and 102. The hammer members 100 and 102 can generally be located adjacent to and within the circumference of the mode collar 26. By providing the cooperating hammer members 100, 102 in this location a particularly compact transmission and hammer mechanism can be provided. As described hereinafter, hammer member 100 is fixed to the housing so that it is non-rotatable or non-rotating. On the other hand, hammer member 102 is fixed to the output spindle 40, e.g., splined or press fit together, so that hammer member 102 rotates together with the spindle 40. In other words, the hammer member 102 is rotatable or rotating. The hammer members 100 and 102 have cooperating ratcheting teeth 104 and 106, hammer members 100 and 102, which are conventional, for delivering the desired vibratory impacts to the output spindle 40 when the tool is in the hammer-drill mode of operation. The hammer members 100, 102 can be made of hardened steel. Alternatively, the hammer members 100, 102 can be made of another suitable hard material.

Figure 14:
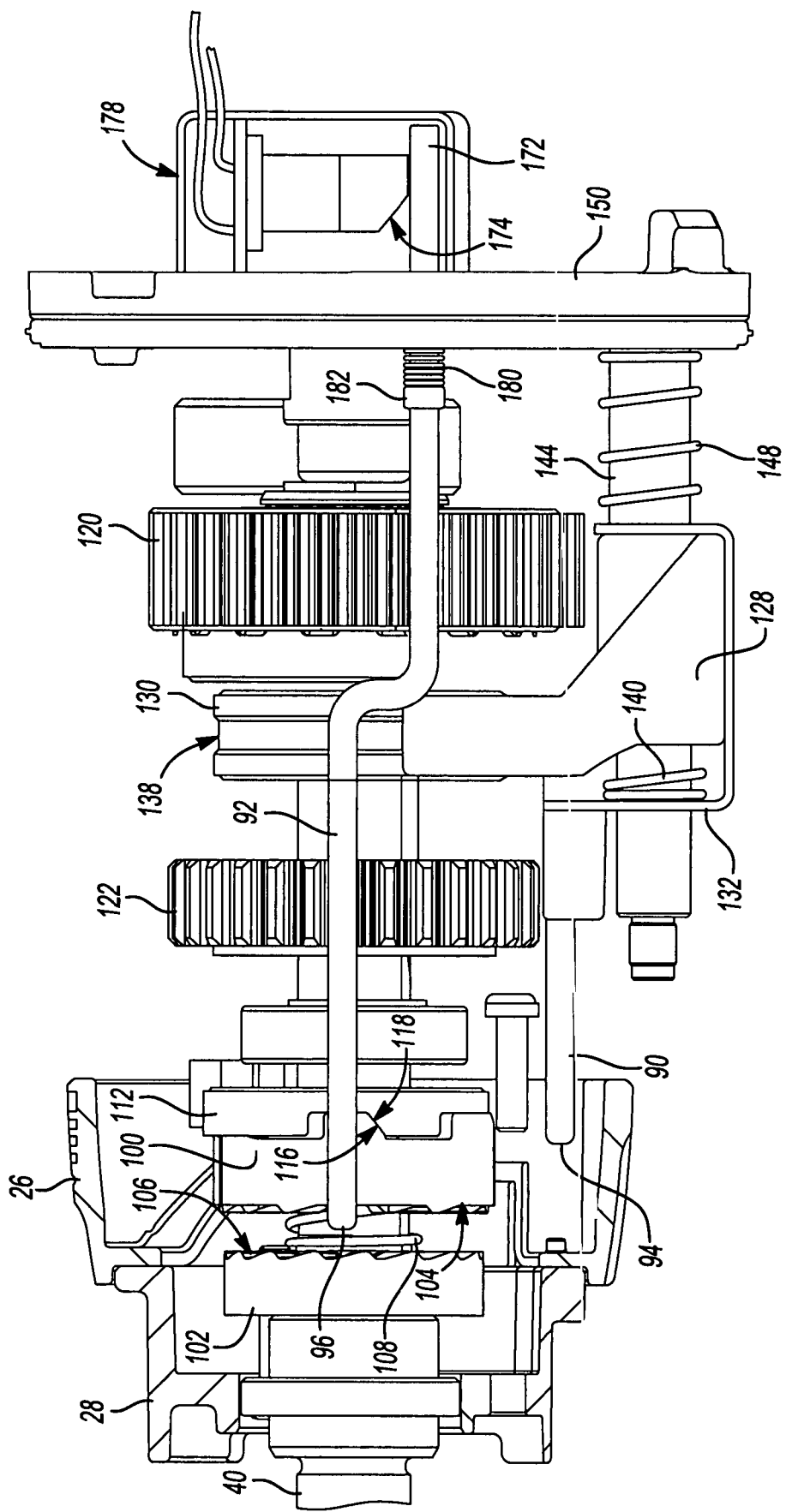
FIG. 14 is a partial side view of the transmission of the hammer-drill shown with the mode collar in section and in the first mode (electronic low)
Figure 17:
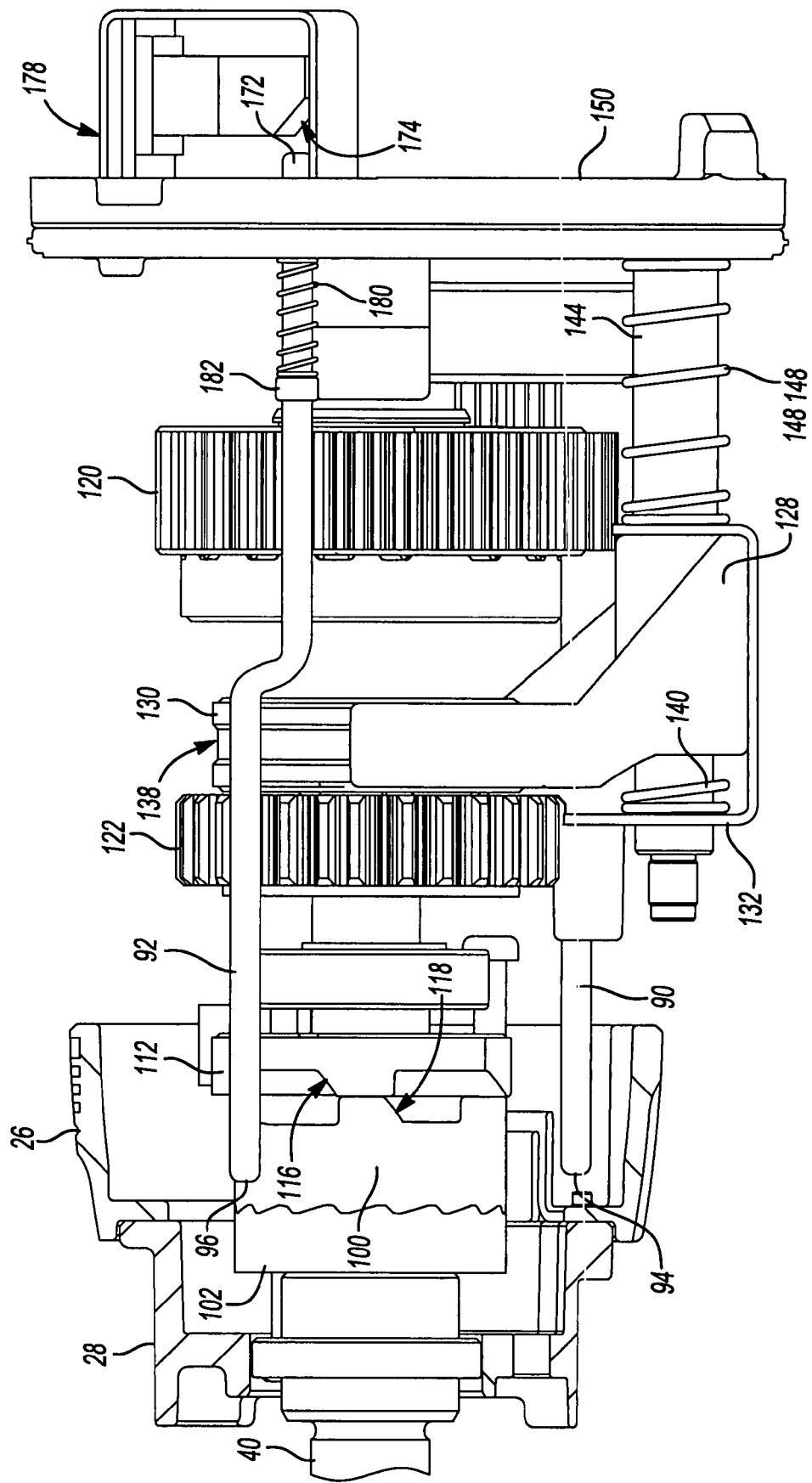
FIG. 17 is a partial side view of the transmission of the hammer-drill shown with the mode collar in section and in the fourth mode (mechanical high speed and hammer mode)

A spring 108 is provided to forwardly bias the output spindle 40 as shown in FIG. 14, thereby tending to create a slight gap between opposed faces of the hammer members 100 and 102. In operation in the hammer mode as seen in FIG. 17, a user contacts a drill bit against a workpiece exerting a biasing force on the output spindle 40 that overcomes the biasing force of spring 108. Thus, the user causes cooperating ratcheting teeth 104 and 106 of the hammer members 100 and 102, respectively, to contact each other, thereby providing the hammer function as the rotating hammer member 102 contacts the non-rotating hammer member 100.

Referring to FIGS. 24 and 25, axially movable hammer member 100 includes three equally spaced projections 250 that extend radially. The radial projections 250 can ride in corresponding grooves 266 in the forward housing 16. An axial groove 252 can be located along an exterior edge of each radial projection 250. The axial groove 252 provides a support surface along its length. Positioned within each axial groove 252 is a support guide rod 254 that provides a cooperating support surface at its periphery. Thus, the axial groove 252 operates as a support aperture having a support surface associated therewith, and the guide rod 254 operates as a support member having a cooperating support surface associated therewith.

Located on each hammer support rod 254 is a return spring 256. The return spring 256 is a biasing member acting upon the non-rotating hammer member to bias the non-rotating hammer toward the non-hammer mode position. The proximal end of each hammer support rod 254 can be press-fit into one of a plurality of first recesses 260 in the forward housing 16. This forward housing 16 can be the gear case housing. This forward housing 16 can be wholly or partially made of aluminum. Alternatively, the forward housing 16 can be wholly or partially made of plastic or other relatively soft material. The plurality of first recesses can be located in the relatively soft material of the forward housing 16. The distal end of each hammer support rod 254 can be clearance fit into one of a plurality of second recesses 262 in the end cap 28. The end cap 28 can be wholly or partially made of a material which is similar to that of the forward housing 16. Thus, the plurality of second recesses 262 of the end cap 28 can be located in the relatively soft material. The end cap 28 is attached to the forward housing member 16 with a plurality of fasteners 264 which can be screws.

The support rods 254 can be made of hardened steel. Alternatively, the support rods 254 can be made of another suitable hard material, so that the support rods are able to resist inappropriate wear which might otherwise be caused by the axially movable hammer member 100, during hammer operation. The hammer members 100, 102 can be made of the same material as the support rods 254. To resist wear between the support rods 254 (which can be of a relatively hard material) and the recesses 260, 262 (which can be of a relatively soft material), the recesses 260, 262 can have a combined depth so they can together accommodate at least about 25% of the total axial length of the support rod 254; or alternatively, at least about 30% the length. In addition, press-fit recesses 260 can have a depth so it accommodates at least about 18% of the total axial length of the support rod 254; or alternatively, at least about 25% of the length. Further, each of the recesses 260, 262 can have a depth of at least about 12% of the axial length of the support rod 254.

Thus, the hammer member 100 is permitted limited axial movement, but not permitted to rotate with the axial spindle 40. The support rods 254 can provide the rotational resistance necessary to support the hammer member 100 during hammer operation. As a result, the projections 250 of the typically harder hammer member 100 can avoid impacting upon and damaging the groove 266 walls of the forward housing 16. This can permit the use of an aluminum, plastic, or other material to form the forward housing 16.

Figure 4:
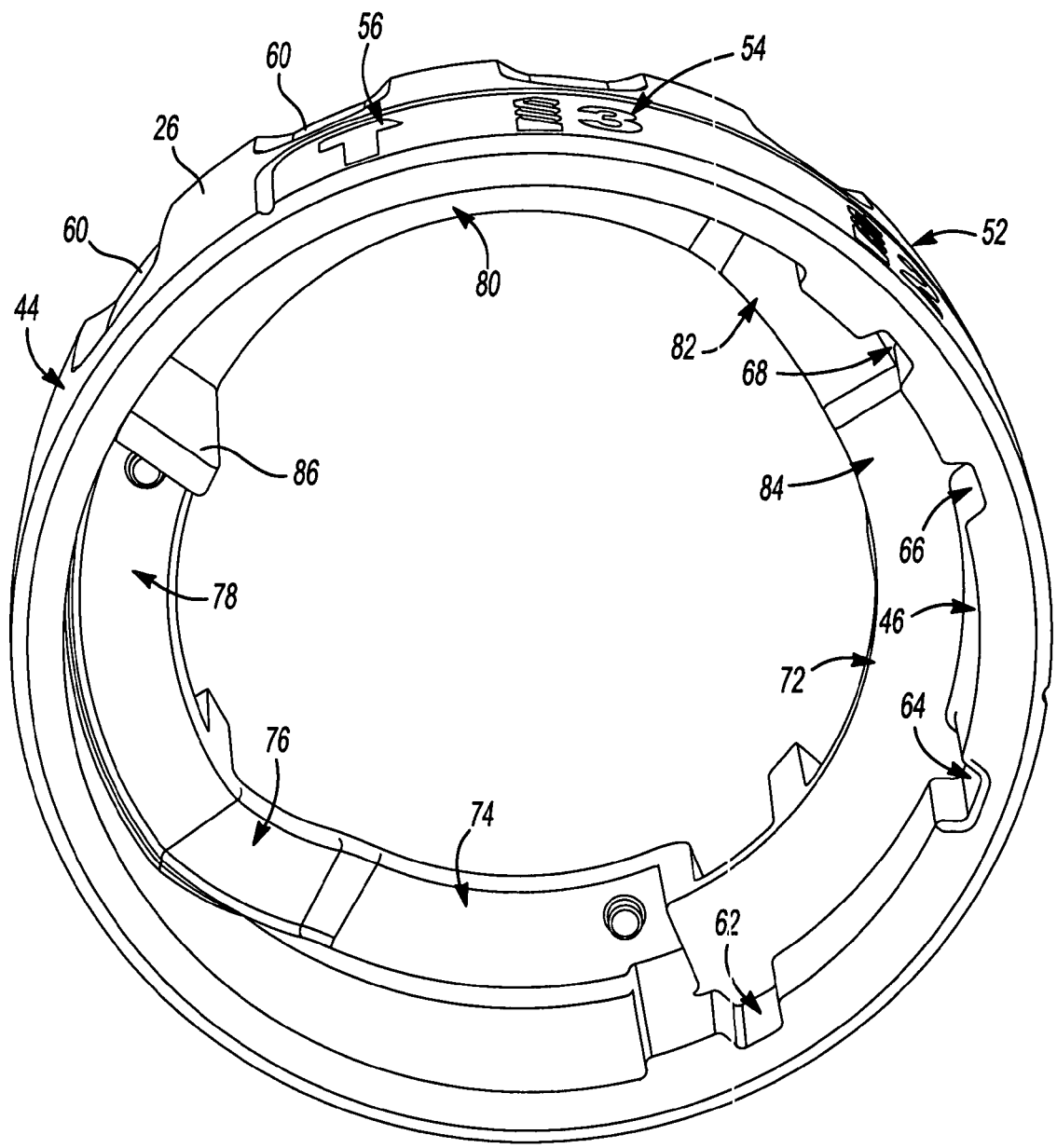
FIG. 4 is a rear perspective view of the mode collar of FIG. 3.
Figure 5:
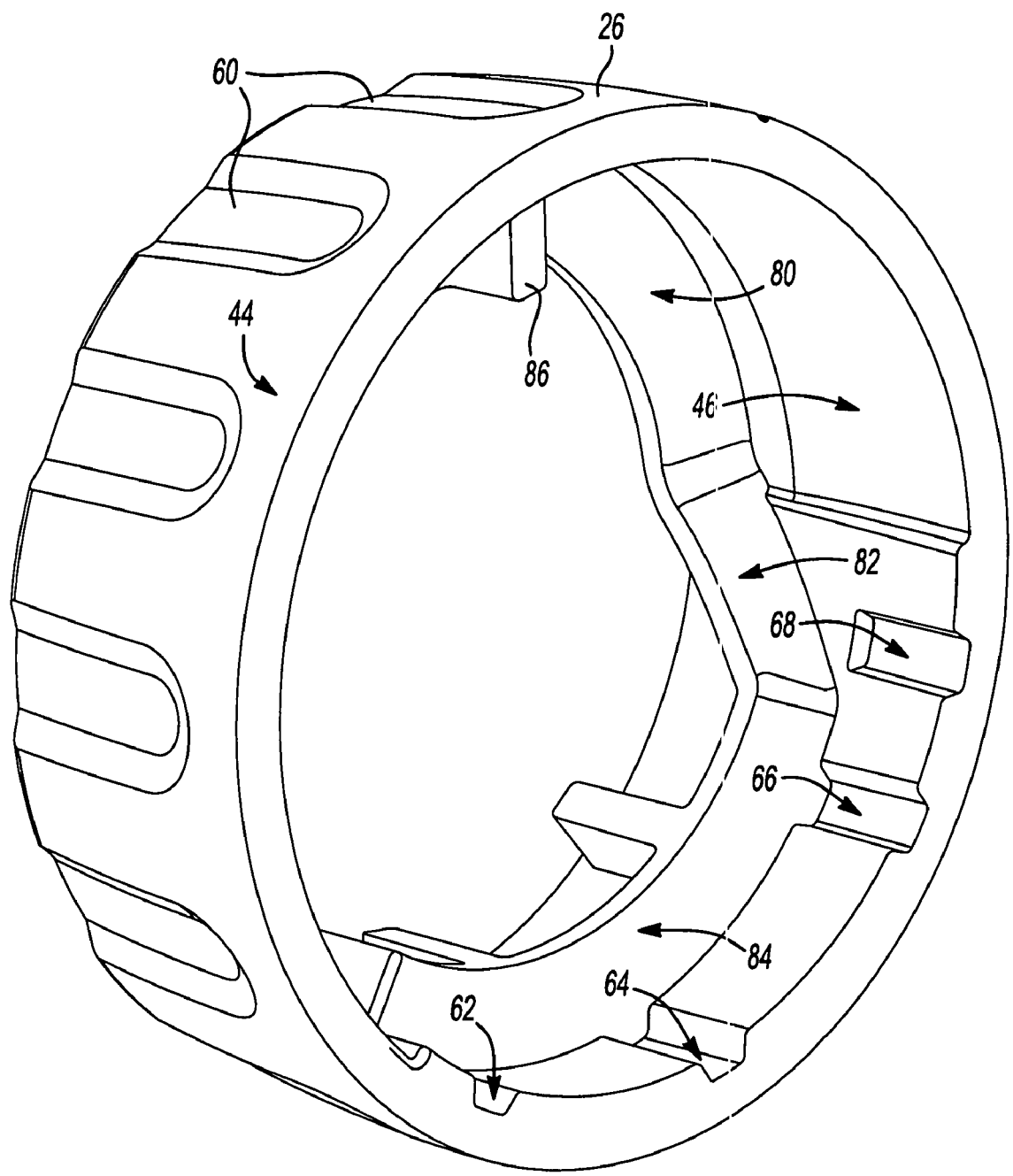
FIG. 5 is another rear perspective view of the mode collar of FIG. 3.
Figure 10:
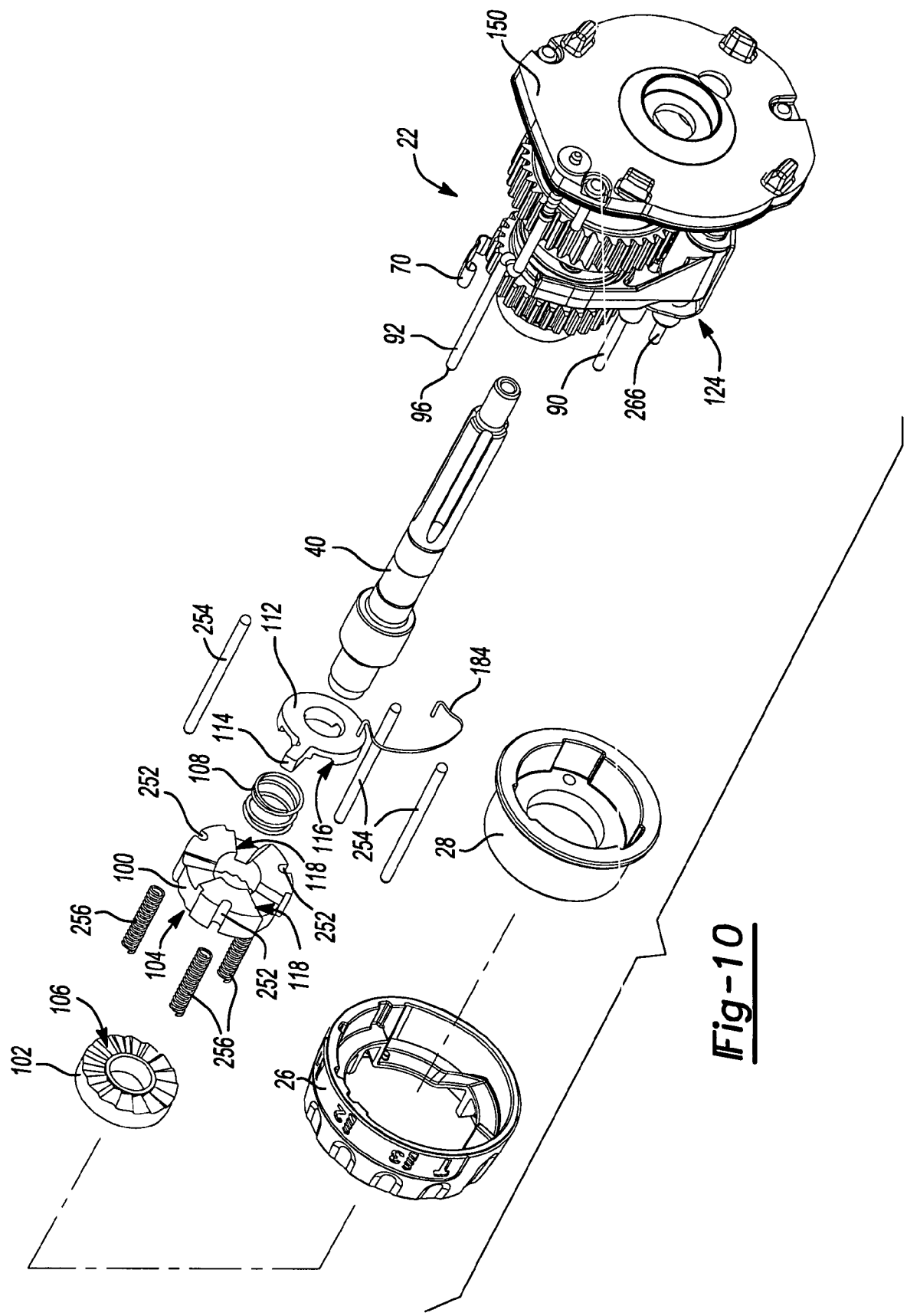
FIG. 10 is an exploded perspective view of a transmission of the multi-speed hammer-drill of FIG. 1.

On the side of hammer member 100 opposite ratcheting teeth 104, a cam 112 having a cam arm 114 and a series of ramps 116 is rotatably disposed axially adjacent to the axially movable hammer member 100. During rotation of the mode collar 26 into the "hammer-drill" mode, the cam arm 114 is engaged and thereby rotated by the hammer cam drive rib 86 (FIG. 4). Upon rotation of the cam 112, the series of ramps 116 defined on the cam 112 ride against complementary ramps 118 defined on an outboard face of the axially movable hammer member 100 to urge the movable hammer member 100 into a position permitting cooperative engagement with the rotating hammer member 102. Spring 184 is coupled to cam arm 144, so that upon rotation of the mode collar 26 backwards, out of the hammer mode, the spring 184 anchored by bolt 266 rotates cam 112 backwards.

With continued reference to FIGS. 10-17, the transmission 22 will now be described in greater detail. The transmission 22 generally includes a low output gear 120, a high output gear 122, and a shift sub-assembly 124. The shift sub-assembly 124 includes a shift fork 128, a shift ring 130, and a shift bracket 132. The shift fork 128 defines an annular tooth 136 (FIG. 12) that is captured within a radial channel 138 defined on the shift ring 130. The shift ring 130 is keyed for concurrent rotation with the output spindle 40. The axial position of the shift ring 130 is controlled by corresponding movement of the shift fork 128. The shift ring 130 carries one or more pins 140. The pins 140 are radially spaced from the output spindle 40 and protrude from both sides of the shift ring 130. One or more corresponding pockets or detents (not specifically shown) are formed in the inner face of the low output gear 120 and the high output gear 122, respectively. The pins 140 are received within their respective detent when the shift ring 130 is shifted axially along the output spindle 40 to be juxtaposed with either the low output gear 120 or the high output gear 122.

The shift fork 128 slidably translates along a static shift rod 144 upon axial translation of the mechanical speed shift pin 90. A first compliance spring 146 is disposed around the static shift rod 144 between the shift bracket 132 and the shift fork 128. A second compliance spring 148 is disposed around the static shift rod 144 between the shift bracket 132 and a cover plate 150. The first and second compliance springs 146 and 148 urge the shift fork 128 to locate the shift ring 130 at the desired location against the respective low or high output gear 120 or 122, respectively. In this way, in the event that during shifting the respective pins 140 are not aligned with the respective detents, rotation of the low and high output gears 120 and 122 and urging of the shift fork 128 by the respective compliance springs 146 and 148 will allow the pins 140 to will be urged into the next available detents upon operation of the tool and rotation of the gears 120, 122. In sum, the shift sub-assembly 124 can allow for initial misalignment between the shift ring 130 and the output gears 120 and 122.

An output member 152 of the motor 20 (FIG. 18) is rotatably coupled to a first reduction gear 154 (FIG. 12) and a first and second reduction pinions 156 and 158. The first and second reduction pinions 156, 158 are coupled to a common spindle. The first reduction pinion 156 defines teeth 160 that are meshed for engagement with teeth 162 defined on the low output gear 120. The second reduction pinion 158 defines teeth 166 that are meshed for engagement with teeth 168 defined on the high output gear 122. As can be appreciated, the low and high output gears 120 and 122 are always rotating with the output member 152 of the motor 20 by way of the first and second reduction pinions 156 and 158. In other words, the low and high output gears 120 and 122 remain in meshing engagement with the first and second reduction pinions 156 and 158, respectively, regardless of the mode of operation of the drill 10. The shift sub-assembly 124 identifies which output gear (i.e., the high output gear 122 or the low output gear 120) is ultimately coupled for drivingly rotating the output spindle 40 and which spins freely around the output spindle 40.

With specific reference now to FIGS. 14-17, shifting between the respective modes of operation will be described. FIG. 14 illustrates the hammer-drill 10 in the mode "1". Again, mode "1" corresponds to the electronic low speed setting. In mode "1", the distal tip 96 of the electronic speed shift pin 92 is located on the electronic shift pin plateau 84 of the mode collar 26 (see also FIG. 6). As a result, the electronic speed shift pin 92 is translated to the right as viewed in FIG. 14. As will be described in greater detail later, translation of the electronic speed shift pin 92 causes a proximal end 172 of the electronic speed shift pin 92 to slidably translate along a ramp 174 defined on an electronic speed shift switch 178. Concurrently, the mechanical speed shift pin 90 is located on the mechanical shift pin plateau 78 of the mode collar 26 (see also FIG. 6). As a result, the mechanical speed shift pin 90 is translated to the right as viewed in FIG. 14. As shown, the mechanical speed shift pin 90 urges the shift fork 128 to the right, thereby ultimately coupling the low output gear 120 with the output spindle 40. Of note, the movable and fixed hammer members 100 and 102 are not engaged in mode "1".

Figure 15:
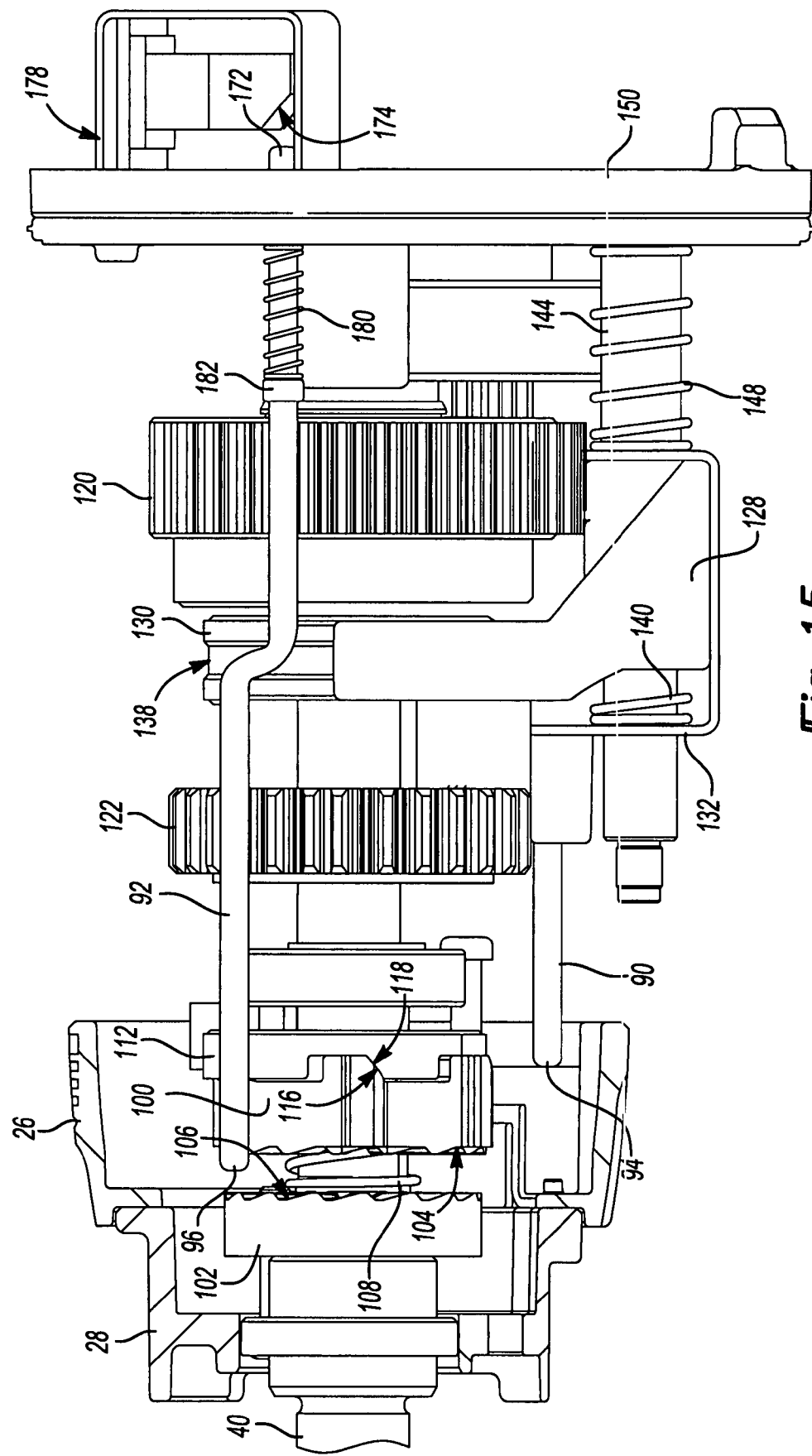
FIG. 15 is a partial side view of the transmission of the hammer-drill shown with the mode collar in section and in the second mode (mechanical low)

FIG. 15 illustrates the hammer-drill 10 in the mode "2". Again, mode "2" corresponds to the mechanical low speed setting. In mode "2", the distal tip 96 of the electronic speed shift pin 92 is located on the electronic shift pin valley 80 of the mode collar 26 (see also FIG. 7). As a result, the electronic speed shift pin 92 is translated to the left as viewed in FIG. 15. Translation of the electronic speed shift pin 92 causes the proximal end 172 of the electronic speed shift pin 92 to slidably retract from engagement with the ramp 174 of the electronic speed shift switch 178. Retraction of the electronic speed shift pin 92 to the left is facilitated by a return spring 180 captured around the electronic speed shift pin 92 and bound between a collar 182 and the cover plate 150.

Concurrently, the mechanical speed shift pin 90 is located on the mechanical shift pin plateau 78 of the mode collar 26 (see also FIG. 7). As a result, the mechanical speed shift pin 90 remains translated to the right as viewed in FIG. 15. Again, the mechanical speed shift pin 90 locating the shift fork 128 to the position shown in FIG. 15 ultimately couples the low output gear 120 with the output spindle 40. Of note, as in mode 1, the movable and fixed hammer members 100 and 102 are not engaged in mode "2". Furthermore, shifting between mode 1 and mode 2 results in no change in the axial position of one of the shift pins (shift pin 90), but results in an axial change in the position of the other shift pin (shift pin 92) as a result of the cam surface 72 of the mode collar 26.

Figure 16:
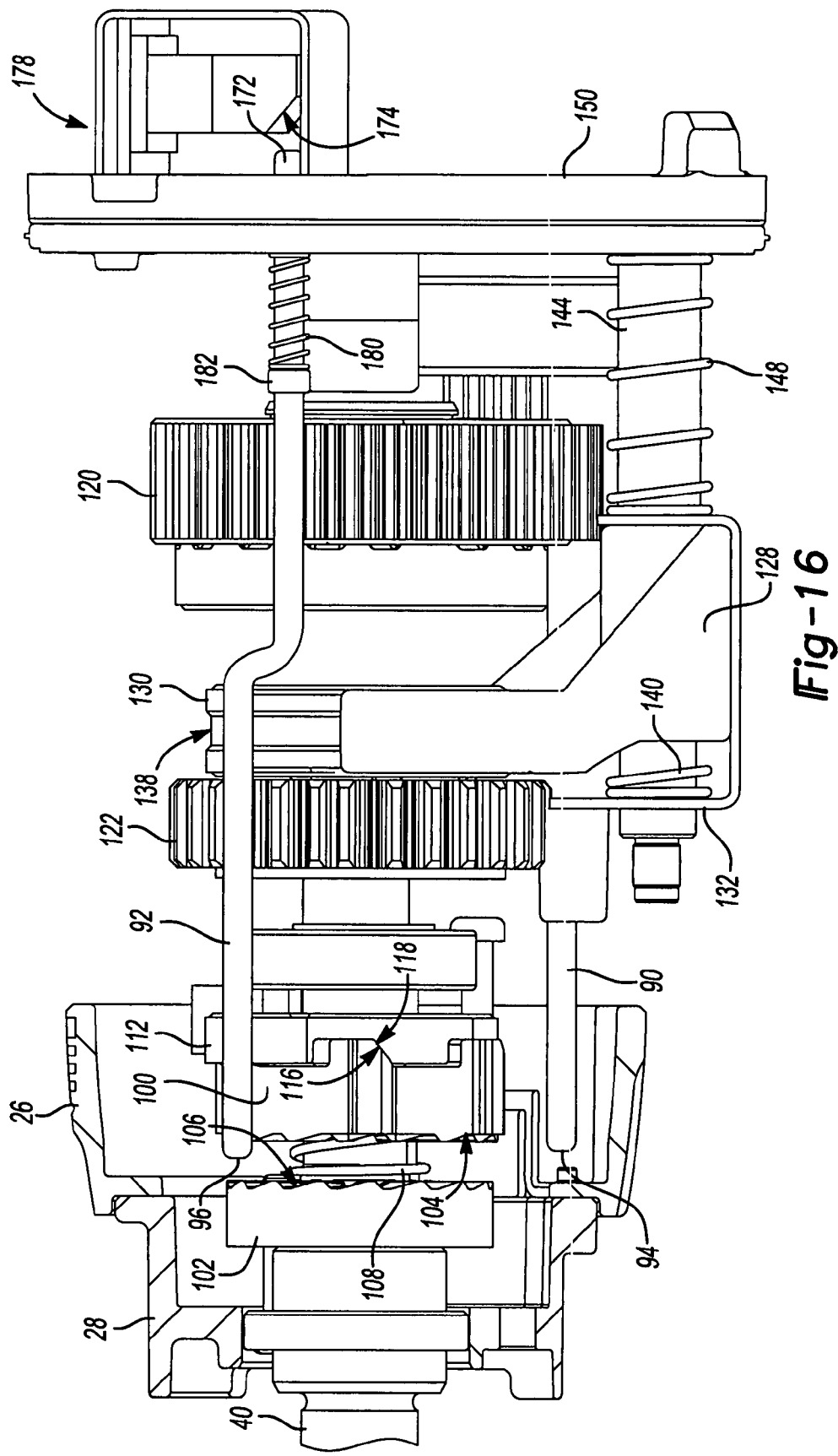
FIG. 16 is a partial side view of the transmission of the hammer-drill shown with the mode collar in section and in the third mode (mechanical high)

FIG. 16 illustrates the hammer-drill 10 in the mode "3". Again, mode "3" corresponds to the mechanical high speed setting. In mode "3", the distal tip 96 of the electronic speed shift pin 92 is located on the electronic shift pin valley 80 of the mode collar 26 (see also FIG. 8). As a result, the electronic speed shift pin 92 remains translated to the left as viewed in FIG. 16. Again, in this position, the proximal end 172 of the electronic speed shift pin 92 is retracted from engagement with the ramp 174 of the electronic speed shift switch 178. Concurrently, the mechanical speed shift pin 90 is located on the mechanical shift pin valley 74 of the mode collar 26 (see also FIG. 8). As a result, the mechanical speed shift pin 90 is translated to the left as viewed in FIG. 16. Again, the mechanical speed shift pin 90 locating the shift fork 128 to the position shown in FIG. 16 ultimately couples the high output gear 120 with the output spindle 40. Of note, the movable and fixed hammer members 100 and 102 are not engaged in mode "3". Again, shifting between mode 2 and mode 3 results in no change in the axial position of one of the shift pins (shift pin 92), but results in an axial change in the position of the other shift pin (shift pin 90) as a result of the cam surface 72 of the mode collar 26.

FIG. 17 illustrates the hammer-drill 10 in the "hammer-drill" mode. Again, the "hammer-drill" mode corresponds to the mechanical high speed setting with the respective movable and fixed hammer members 100 and 102 engaged. In the "hammer-drill" mode, the distal tip 96 of the electronic speed shift pin 92 is located on the electronic shift pin valley 80 of the mode collar 26 (see also FIG. 9). As a result, the electronic speed shift pin 92 remains translated to the left as viewed in FIG. 17. Again, in this position the proximal end 172 of the electronic speed shift pin 92 is retracted from engagement with the ramp 174 of the electronic speed shift switch 178. Concurrently, the mechanical speed shift pin 90 is located on the mechanical shift pin valley 74 of the mode collar 26 (see also FIG. 9). As a result, the mechanical speed shift pin 90 remains translated to the left as viewed in FIG. 17. Thus, in shifting between mode 3 and mode 4, both the electronic speed shift pin 92 and the mechanical shift pin 90 remain in the same axial position. As discussed below, however, another (non-speed) mode selection mechanism changes position. Specifically, cam 112 is caused to rotate (into an engaged position) by cooperation between the cam drive rib 86 of the mode collar 26 and the cam arm 114 of the cam 112. A return spring 184 (FIG. 10) urges the cam 112 to rotate into an unengaged position upon rotation of the mode collar 26 away from the "hammer-drill" mode.

In the "hammer-drill" mode, however, the respective axially movable and hammer member 100 is axially moved into a position where it can be engaged with rotating hammer member 102. Specifically, the manual application of pressure against a workpiece (not seen), the output spindle moves axially back against biasing spring 108. This axial movement of the output spindle 40 carries the rotating hammer member 102 is sufficient that, since the axially movable hammer member 100 has been moved axially forward, the ratchets 104, 106 of the hammer members 100 and 102, respectively, are engagable with each other. Moreover, selection of the "hammer-drill" mode automatically defaults the shift sub-assembly 124 to a position corresponding to the mechanical high speed setting simply by rotation of the mode collar 26 to the "hammer-drill" setting 56 and without any other required actuation or settings initiated by the user. In other words, the mode collar 26 is configured such that the hammer mode can only be implemented when the tool is in a high speed setting.

Figure 18:
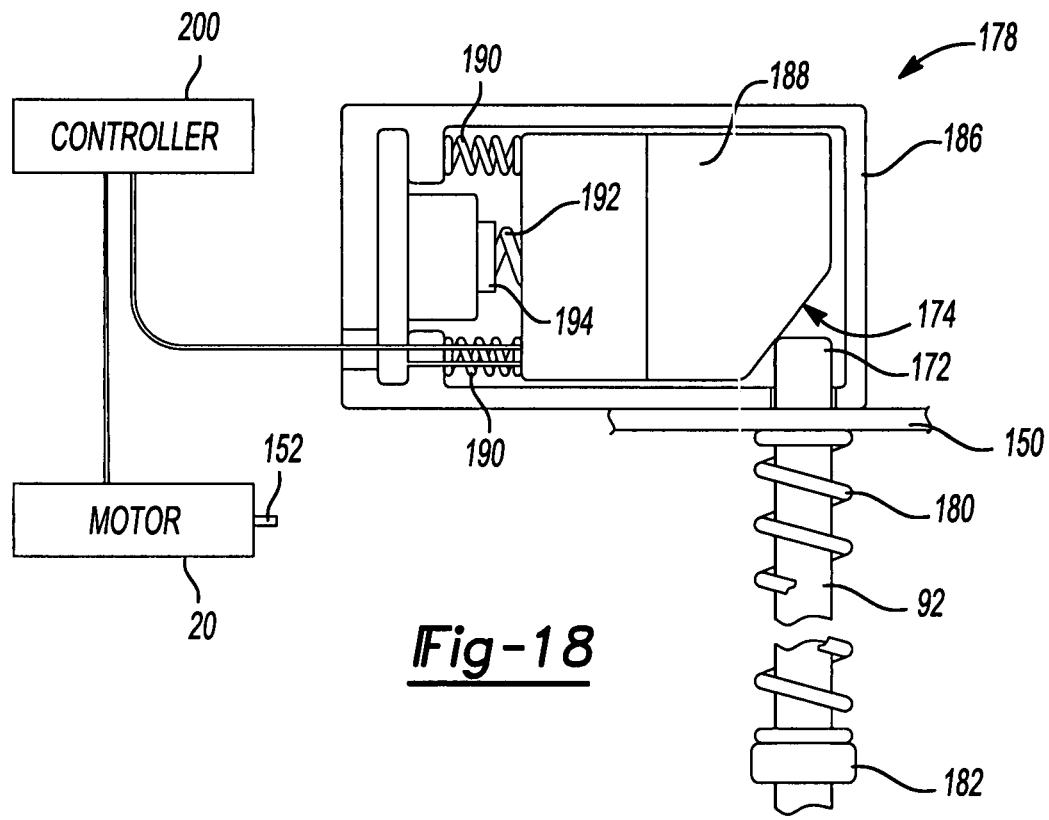
FIG. 18 is a plan view of an electronic speed shift switch according to the present teachings and shown in an un-actuated position.
Figure 19:
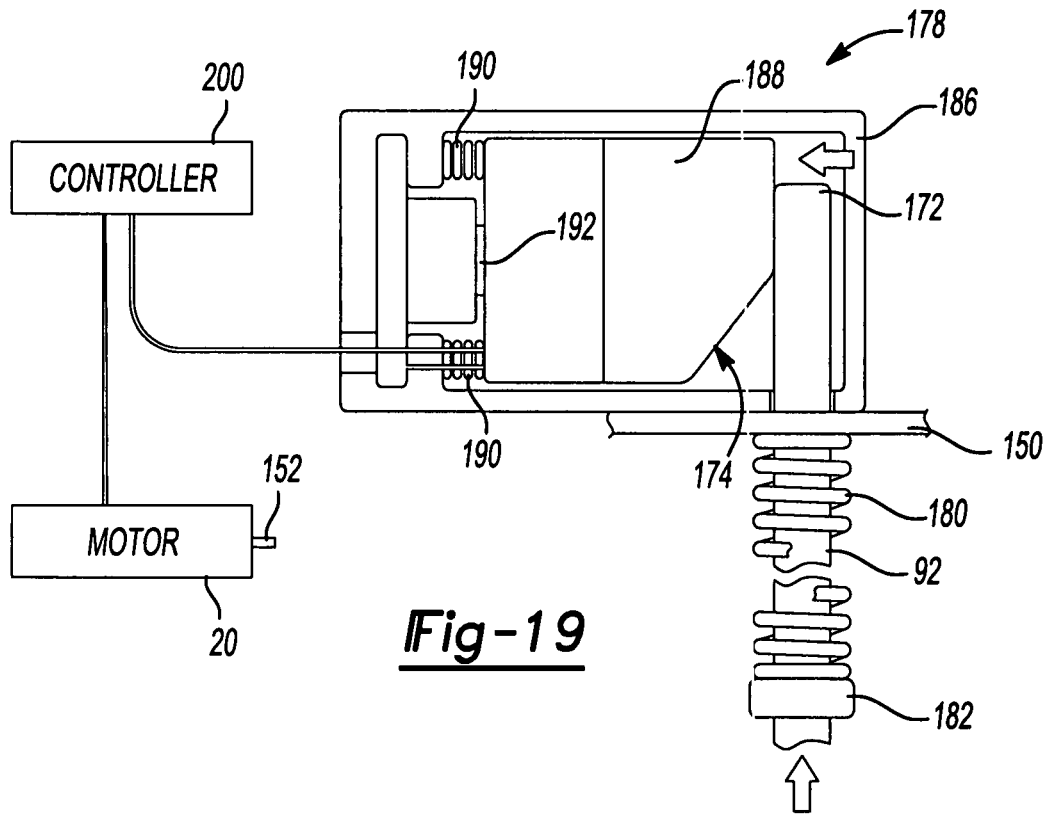
FIG. 19 is a plan view of the electronic speed shift switch of FIG. 18 and shown in an actuated position.

With reference now to FIGS. 18 and 19, the electronic speed shift switch 178 will be described in greater detail. The electronic speed shift switch 178 generally includes an electronic speed shift housing 186, an intermediate or slide member 188, return springs 190, an actuation spring 192, and a push button 194. Translation of the electronic speed shift pin 92 to the position shown in FIG. 14 (i.e., the electronic low speed setting) corresponding to mode 1 causes the proximal end 172 of the electronic shift pin 92 to slidably translate along the ramp 174 and, as a result, urge the slide member 188 leftward as viewed in FIG. 19.

In the position shown in FIG. 18, the compliance spring applies a biasing force to the push button 194 that is weaker than the biasing force of the push button spring (not shown) inside the switch. As the slide member 188 is moved to the position shown in FIG. 19, The biasing force from the actuation spring 192 pressing on the push button 194, overcomes the resistance provided by the pushbutton 194. Thus, the large movement of the slide member 188 is converted to the small movement used to actuate the push button 194 via the actuation spring 192. The return springs 190 operate to resist inadvertent movement of the slide member 188, and to return the slide member 188 to its position in FIG. 18.

Of note, the slide member 188 is arranged to actuate in a transverse direction relative to the axis of the output spindle 40. As a result, inadvertent translation of the slide member 188 is reduced. Explained further, reciprocal movement of the hammer-drill 10 along the axis 30 may result during normal use of the hammer-drill 10 (i.e., such as by engagement of the hammer members 100 and 102 while in the "hammer-drill" mode, or other movement during normal drilling operations). By mounting the electronic speed shift switch 178 transverse to the output spindle 40, inadvertent translation of the slide member 188 can be minimized.

As shown from FIG. 18 to FIG. 19, the push button 194 is depressed with enough force to activate the electronic speed shift switch 178. In this position (FIG. 19), the electronic speed shift switch 178 communicates a signal to a controller 200. The controller 200 limits current to the motor 20, thereby reducing the output speed of the output spindle 40 electronically based on the signal. Since the actuation is made as a result of rotation of the mode collar 26, the electronic actuation is seamless to the user. The electronic low speed mode can be useful when low output speeds are needed such as, but not limited to, drilling steel or other hard materials. Moreover, by incorporating the electronic speed shift switch 178, the requirement of an additional gear or gears within the transmission 22 can be avoided, hence reducing size, weight and ultimately cost. Retraction of the electronic speed shift pin 92 caused by a mode collar selection of either mode "2", "3", or "hammer-drill", will return the slide member 188 to the position shown in FIG. 18. The movement of the slide member 188 back to the position shown in FIG. 18 is facilitated by the return springs 190. While the electronic speed shift switch 178 has been described as having a slide member 188, other configurations are contemplated. For example, the electronic speed shift switch 178 may additionally or alternatively comprise a plunger, a rocker switch or other switch configurations.

Referring now to FIGS. 1, 11, and 23, another aspect of the hammer-drill 10 is illustrated. As mentioned above, the hammer-drill 10 includes the rearward housing 14 (i.e., the motor housing) for enclosing the motor 20 and the forward housing 16 (i.e., the transmission housing) for enclosing the transmission 22. The forward housing 16 includes a gear case housing 149 (FIGS. 1 and 23) and a cover plate 150 (FIGS. 11 and 23).

The gear case housing 149 defines an outer surface 179. It is understood that the outer surface 179 of the gear case housing 149 partially defines the overall outer surface of the hammer-drill 10. In other words, the outer surface 179 is exposed to allow a user to hold and grip the outer surface 179 during use of the hammer-drill 10.

The cover plate 150 is coupled to the gear case housing 149 via a plurality of first fasteners 151. As shown in FIG. 23, the first fasteners 151 are arranged in a first pattern 153 (represented by a bolt circle in FIG. 23). The first fasteners 151 can be located within the periphery of the gear case housing 149 and can hold the cover plate 150 against a lip 290 within the gear case housing 149. In one embodiment, the forward housing 16 includes a seal (not shown) between the gear case housing 149 and the cover plate 150, which reduces leakage of lubricant (not shown) out of the forward housing 16.

The forward housing 16 and the rearward housing 14 are coupled via a plurality of second fasteners 159 (FIG. 1). In the embodiment represented in FIG. 23, the second fasteners 159 are arranged in a second pattern 161 (represented by a bolt circle in FIG. 23). As shown, the second pattern 161 of the second fasteners 159 has a larger periphery than the first pattern 153 of the first fasteners 151. In other words, the second fasteners 159 are further outboard than the first fasteners 151. Thus, when the forward housing 16 and the rearward housing 14 are coupled, the forward housing 16 and the rearward housing 14 cooperate to enclose the first fasteners 151.

Also, in the embodiment shown, the cover plate 150 can include a plurality of pockets 155. The pockets 155 can be provided such that the heads of the first fasteners 151 are disposed beneath an outer surface 157 of the cover plate 150. As such, the first fasteners 151 are unlikely to interfere with the coupling of the rearward and forward housings 14, 16.

Figure 12:
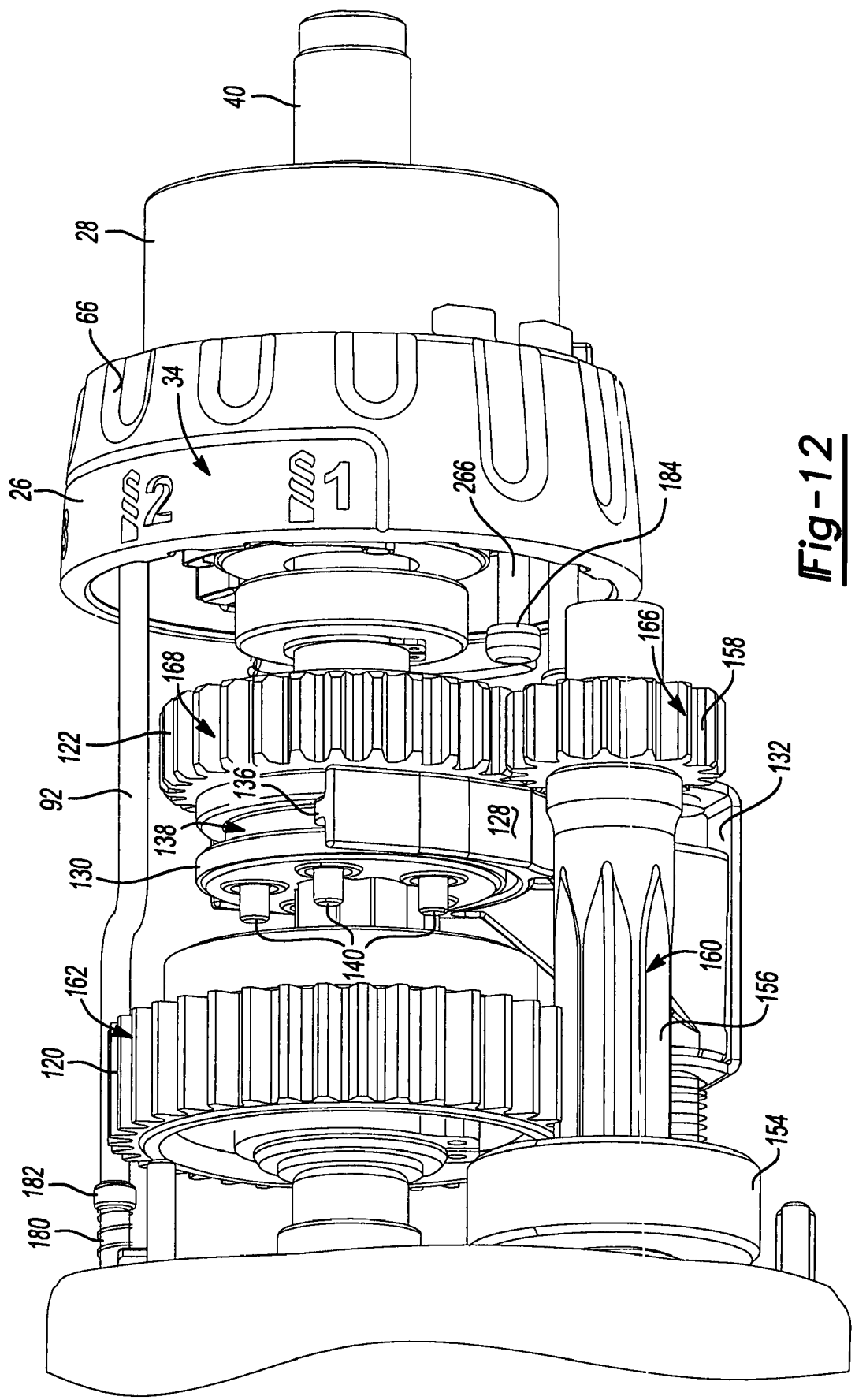
FIG. 12 is a perspective view of the mode collar and transmission of the hammer-drill of FIG. 1 illustrating reduction pinions according to the present teachings.

The cover plate 150 also includes a plurality of projections 163 that extend from the outer surface 157. The projections 163 extend into the rearward housing 14 to ensure proper orientation of the forward housing 16. The cover plate 150 further includes a first aperture 165. The output member 152 of the motor 20 extends through the aperture 165 to thereby rotatably couple to the first reduction gear 154 (FIG. 12).

Figure 13:
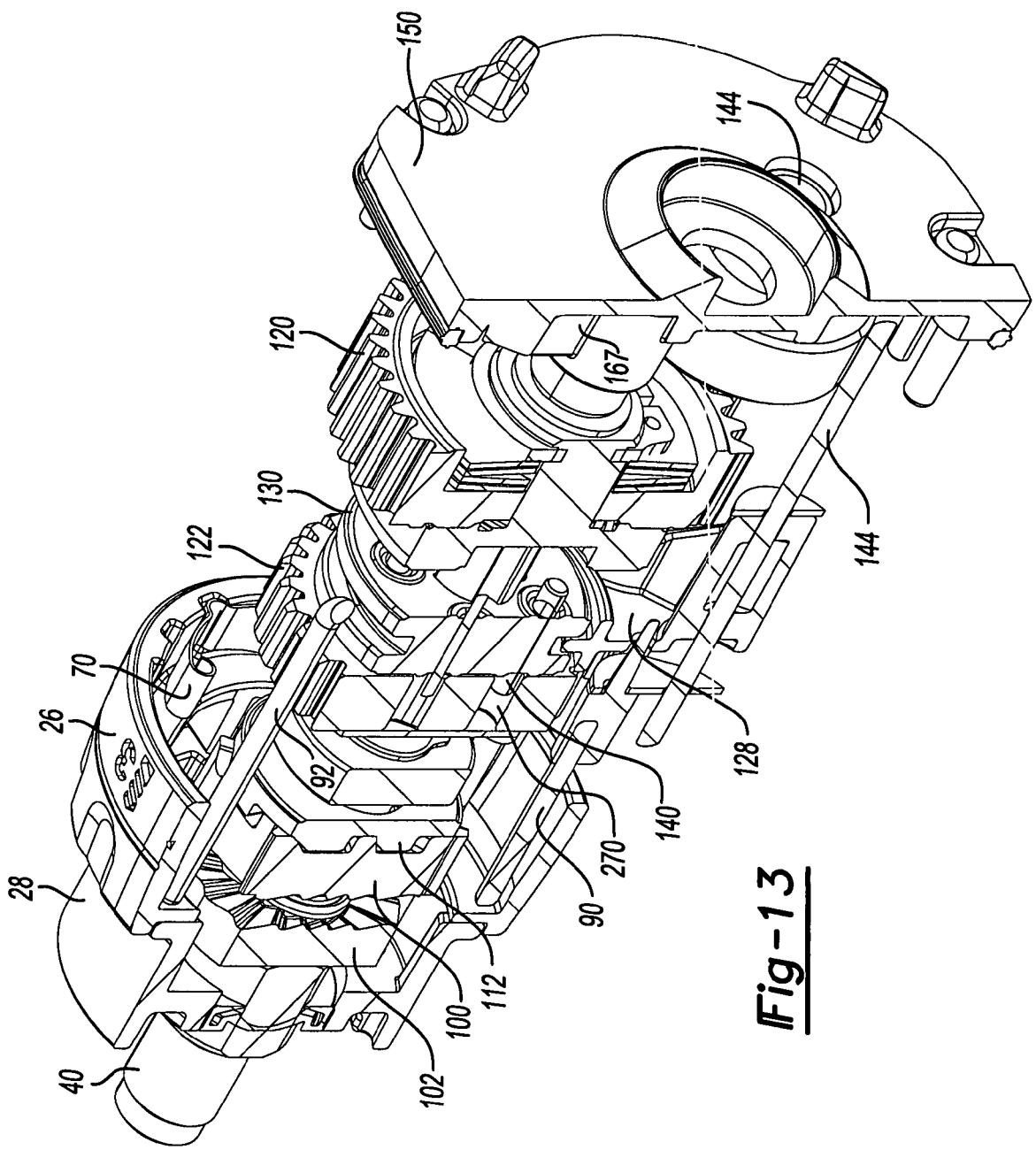
FIG. 13 is a partial sectional view of the hammer-drill taken along lines 13-13 of FIG. 11.

Also, as shown in FIG. 13, the cover plate 150 includes a support 167 extending toward the interior of the forward housing 16. The support 167 is generally hollow and encompasses the output spindle 40 such that the output spindle 40 journals within the support 167.

As shown in FIGS. 18, 19, and 23 and as described above, the proximal end 172 electronic speed shift pin 92 extends out of the forward housing 16 through the cover plate 150 so as to operably engage the electronic speed shaft switch 178 (FIG. 19). Also, as described above, the return spring 180 is disposed around the electronic speed shift pin 92 and is bound between the collar 182 and the cover plate 150. Thus, the return spring 180 biases the electronic speed shift pin 92 against the cover plate 150 toward the interior of the forward housing 16.

Furthermore, as described above and seen in FIGS. 11 and 13, static shift rod 144 is supported at one end by the gear case cover plate 150. In addition, the second compliance spring 148 that is disposed about the static shift rod 144 and extends between the shift bracket 132 and the cover plate 150. As such, the second compliance spring 148 can be biased against the shift bracket 132 and the cover plate 150.

The configuration of the cover plate 150 and the outer shell 149 of the forward housing 16 allows the transmission 22 to be contained independent of the other components of the hammer-drill 10. As such, manufacture of the hammer-drill 10 can be facilitated because the transmission 22 can be assembled substantially separate from the other components, and the forward housing 16 can then be subsequently coupled to the rearward housing 14 for added manufacturing flexibility and reduced manufacturing time.

Furthermore, the cover plate 150 can support several components including, for instance, the output spindle 40 the static shift rod 144 and the electronic shift rod 92. In addition, several springs can be biased against the cover plate, for instance, compliance spring 148 and spring 180. Thus, proper orientation of these components are ensured before the rearward housing 14 and the forward housing 16 are coupled. In addition, the cover plate 150 holds the transmission and shift components and various springs in place against the biasing forces of the springs. As such, the cover plate 150 facilitates assembly of the hammer-drill 10.

Figure 21:
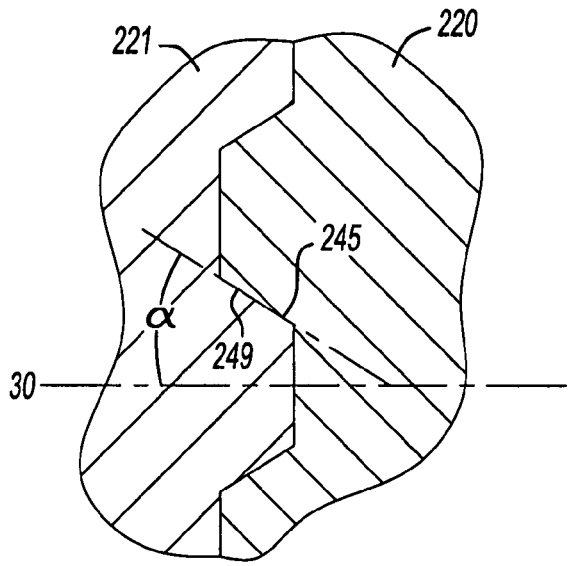
FIG. 21 is a partial cross-section view of the ratchet teeth of the low output gear and clutch member of the transmission of FIG. 20.

Referring now to FIGS. 20 through 22, clutch details of an embodiment of the transmission 22 of the hammer drill 10 is illustrated. The transmission 22 can include a low output gear 220, a clutch member 221, a high output gear 222, and a shift sub-assembly 224. The shift sub-assembly 224 can include a shift fork 228, a shift ring 230, and a shift bracket 232.

As shown in FIG. 20, the clutch member 221 generally includes a base 223 and a head 225. The base 223 is hollow and tubular, and the head 225 extends radially outward from one end of the base 223. The base 223 encompasses the spindle 40 and is fixedly coupled (e.g., splined) thereto such that the clutch member 221 rotates with the spindle 40. The head 225 defines a first axial surface 227, and the head 225 also defines a second axial surface 229 on a side opposite to the first axial surface 227.

The base 223 of the clutch member 221 extends axially through the bore of the low output gear 220 such that the low output gear 220 is supported by the clutch member 221 on the spindle 40. The low output gear 220 can be supported for sliding axial movement along the base 223 of the clutch member 221. Also, the low output gear 220 can be supported for rotation on the base 223 of the clutch member 221. As such, the low output gear 220 can be supported for axial movement and for rotation relative to the spindle 40'.

The transmission 22 also includes a retaining member 231. In the embodiment shown, the retaining member 231 is generally ring-shaped and disposed within a groove 233 provided on an end of the base 223. As such, the retaining member 231 is fixed in an axial position relative to the first axial surface 227 of the base 223.

The transmission 22 further includes a biasing member 235. The biasing member 235 can be a disc spring or a conical (i.e., Belleville) spring. The biasing member 235 is supported on the base 223 between the retaining member 231 and the low output gear 220. As such, the biasing member 235 biases a face 236 of the low output clutch 220 against the face 227 of the base 223 by pressing against the retaining member 231 and low output gear 220.

The clutch member 221 also includes at least one aperture 241 (FIG. 20) on the second axial surface 229. In the embodiment shown, the clutch member 221 includes a plurality of apertures 241 arranged in a pattern corresponding to that of the pins 240 of the shift ring 230 (FIG. 21). As will be described below, axial movement of the shift ring 230 causes the pins 240 to selectively move in and out of corresponding ones of the apertures 241 of the clutch member 221 such that the shift ring 230 selectively couples to the clutch member 221.

Furthermore, the head 225 of the clutch member 221 includes a plurality of ratchet teeth 237 on the first axial surface 227 thereof, and the low output gear 220 includes a plurality of corresponding ratchet teeth 239 that selectively mesh with the ratchet teeth 237 of the clutch member 221. More specifically, as shown in FIG. 22, the ratchet teeth 237 of the clutch member 221 are cooperate with the ratchet teeth 239 of the low output gear 220. Each tooth of the ratchet teeth 237 and 239 can include at least one cam surface 245 and 249, respectively. As will be described, as the clutch member 221 is coupled to the low output gear 220, the ratchet teeth 237 mesh with corresponding ones of the ratchet teeth 239 such that the cam surfaces 245, 249 abut against each other.

As shown in FIG. 22, the cam surfaces 245, 249 of the low output gear 220 and the clutch member 221 are provided at an acute angle a relative to the axis 30 of the spindle 40. As will be described below, when the clutch member 221 and the low output gear 220 are coupled, an amount of torque is able to transfer therebetween up to a predetermined threshold. This threshold is determined according to the angle a of the cam surfaces 245, 249 and the amount of force provided by the biasing member 235 biasing the low output gear 220 toward the clutch member 221.

When the hammer-drill 10 is in the low speed setting (electrical or mechanical) and torque transferred between the low output gear 220 and the clutch member 221 is below the predetermined threshold amount, the corresponding cam surfaces 245, 249 remain in abutting contact to allow the torque transfer. However, when the torque exceeds the predetermined threshold amount (e.g., when the drill bit becomes stuck in the workpiece), the cam surfaces 245 of the clutch member 221 cam against the cam surfaces 249 of the low output gear 220 to thereby move (i.e., cam) the low output gear 220 axially away from the clutch member 221 against the biasing force of the biasing member 235. As such, torque transfer between the clutch member 221 to the low output gear 220 is interrupted and reduced.

It will be appreciated that the clutch member 221 limits the torque transfer between the output member 152 of the motor 20 and the spindle 40 to a predetermined threshold. It will also be appreciated that when the hammer-drill 10 is in the mechanical high speed setting, torque transfers between the second reduction pinion 258 and the spindle 40 via the high output gear 222, and the clutch member 221 is bypassed. However, the gear ratio in the mechanical high speed setting can be such that the maximum torque transferred via the high output gear 222 is less than the predetermined threshold. In other words, the transmission 22 can be inherently torque-limited (below the predetermined threshold level) when the high output gear 222 provides torque transfer.

Thus, the clutch member 221 protects the transmission 22 from damage due to excessive torque transfer. Also, the hammer-drill 10 is easier to use because the hammer-drill 10 is unlikely to violently jerk in the hands of the user due to excessive torque transfer. Furthermore, the transmission 22 is relatively compact and easy to assemble since the clutch member 221 occupies a relatively small amount of space and because only ore clutch member 221 is necessary. Additionally, the transmission 22 is relatively simple in operation since only the low output gear 220 is clutched by the clutch member 221. Moreover, in one embodiment, the hammer-drill 10 includes a pusher chuck for attachment of a drill bit (not shown), and because of the torque limiting provided by the clutch member 221, the pusher chuck is unlikely to over-tighten on the drill bit, making the drill bit easier to remove from the pusher chuck.

Additional locking details of the shifting mechanism are illustrated in FIG. 26. For clarity, these additional locking details have been omitted from the remaining drawings. Thus, as described hereinafter, the transmission shifting mechanism described herein can include a locking mechanism to maintain the transmission in the high speed gear mode. This high speed gear mode can be the only mode in which the hammer mode can also be active. This locking mechanism, therefore, can resist any tendency of the pins 140 of the shift ring 138 to walk out of the corresponding holes 270 in the high speed gear 122, during hammer mode operation.

The static shift rod 144 operates as a support member for supporting the shift bracket 132. The shift bracket 132 or shift member is mounted on the static shift rod 144 in a configuration permitting movement of the shift member along the outer surface of the shift rod between a first mode position corresponding to a first mode of operation and a second mode position corresponding to a second mode of operation. The shift bracket 132 can also mounted on the static shift rod 144 in a configuration permitting limited rotational or perpendicular (to the shift surface) movement between a lock position and an unlock position in a direction that is substantially perpendicular to the shift surface. As illustrated, the shift bracket includes two apertures 282, 284 through which the static shift rod 144 extends. At least one of the apertures 282 can be slightly larger than the diameter of the static shift rod to allow the limited rotational or perpendicular movement of the shift bracket 144.

A groove 268 can be located in the static shift rod 144. The groove 268 has a sloped front surface 272 and a back surface 274 that is substantially perpendicular to the axis of the static shift rod 144. Located on the static shift rod 144 and coupled to the shift bracket 132 is a lock spring member 276. The lock spring 276 fits into an opening 278 in the shift bracket 132, so that the lock spring 276 moves along the axis of the static shift rod 144 together with the shift bracket 132. Thus, when return spring 148 moves the shift bracket 132 into the high speed gear position, the shift bracket 132 aligns with the groove 268. The lock spring 276 exerts a force in a direction of arrow X, which pushes the shift bracket 132 into the groove 268.

The biasing force in the direction of arrow X provided by the lock spring 276 retains the shift bracket 132 in the groove 268. In combination with the perpendicular back surface 274 of the groove 268, which operates with the shift bracket 132 to provide cooperating lock surfaces, the lock spring 276 prevents shift bracket 132 from moving backwards along the static shift rod 144 during hammer mode operation. In this way, the axial forces that are repeatedly exerted on the transmission during hammer mode operation can be resisted by the shifting mechanism.

When shifting out of the high speed gear mode, shift pin 90 operates as an actuation member and exerts a force in the direction of arrow Y. Since this force is offset from the surface of the static shift rod 144, upon which the shift bracket 132 is mounted, this force exerts a moment on the shift bracket 132; thereby providing a force in the direction of arrow Z. This force along arrow Z exceeds the biasing spring force along arrow X, which causes the shift bracket 132 to move out of the groove 268; thereby allowing movement into the low speed gear mode. The locking spring member 276 includes a protrusion 280 which extends into a cooperating opening 282 of the shift bracket 132 to prevent the opposite side of the shift bracket 132 from entering the groove 268 in response to the force in the direction of arrow Z. The protrusion 280 can be in the form of a lip.

For clarity, the direction of the force along arrow X is perpendicular to the axis of the static shift rod 144 and toward the force along arrow Y. The direction of the force along arrow Z is opposite to that of arrow X. The direction of the force along arrow Y is parallel to the axis of the static shift rod 144 and toward the force along arrow X. In addition, the force along arrow Y is spaced away from the axis of the static shift rod 144, so that its exertion on shift bracket 132 generates a moment that results in the force along arrow Z, which opposes the force along arrow X.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A parallel axis transmission for a multi-speed drill for torque transfer between at least one pinion and an output spindle, the transmission comprising:
   a high speed gear mounted on the output spindle;
   a low speed gear mounted on the output spindle;
   a clutch member operably coupled to the low speed gear to transfer torque between the at least one pinion and the output spindle up to a predetermined torque level at the output spindle, when a torque between the clutch member and the low speed gear exceeds the predetermined torque level, the clutch member becomes uncoupled from the low speed gear; and
   a shift assembly for selectively changing between a plurality of modes comprising:

a low speed mode for torque transfer between the at least one pinion and the output spindle via the low speed gear and the clutch member; and a high speed mode for torque transfer between the at least one pinion and the output spindle via the high speed gear so as to bypass the clutch member;

wherein the clutch member is coupled to the output spindle and the low speed gear is mounted on the clutch member.

2. The transmission of claim 1, further comprising a biasing member that biases the low speed gear toward the clutch member.

3. The transmission of claim 2, further comprising a retaining member supported in a fixed axial position relative to the output spindle, wherein the biasing member biases against the retaining member and the low speed gear.

4. The transmission of claim 1, wherein at least one of the low speed gear and the clutch member includes at least one cam surface for camming the low speed gear and the clutch member away from each other when torque between the clutch member and the low speed gear exceeds the predetermined torque level.

5. The transmission of claim 4, wherein each of the clutch member and the low speed gear includes a plurality of cam surfaces, wherein the cam surfaces of the clutch member abut the cam surfaces of the low speed gear for torque transfer therebetween, and wherein the plurality of cam surfaces of the clutch member cam against the plurality of cam surfaces of the low speed gear for camming the low speed gear and the clutch member away from each other when torque between the clutch member and the low speed gear exceeds the predetermined torque level.

6. The transmission of claim 1, further comprising a retaining member and a biasing member for biasing the low speed gear toward the clutch member, wherein the clutch member is fixed to the output spindle, wherein the low speed gear is supported for rotation and axial movement on the clutch member, wherein the retaining member is fixed in an axial position on the clutch member, and wherein the biasing member is supported on the clutch member so as to bias against the retaining member and the low speed gear.

7. A multi-speed drill comprising:
   at least one pinion;
   an output spindle;
   a high speed gear mounted on the output spindle and operable to selectively transfer torque between the at least one pinion and the output spindle;
   a low speed gear mounted on the output spindle and operable to selectively transfer torque between the at least one pinion and the output spindle;
   a clutch member operably coupled to the low speed gear to transfer torque between the at least one pinion and the output spindle up to a predetermined torque level at the output spindle, when a torque between the clutch member and the low speed gear exceeds the predetermined torque level, the clutch member becomes uncoupled from the low speed gear;
   a retaining member and a biasing member to bias the low speed gear toward the clutch member, wherein the clutch member is fixed to the output spindle, wherein the low speed gear is supported for rotation and axial movement on the clutch member, wherein the retaining member is fixed in an axial position on the clutch member, and wherein the biasing member is supported on the clutch member so as to bias against the retaining member and the low speed gear; and a shift assembly for selectively changing between a plurality of modes comprising:
   a low speed mode for torque transfer between the at least one pinion and the output spindle via the low speed gear and the clutch member; and
   a high speed mode for torque transfer between the at least one pinion and the output spindle via the high speed gear so as to bypass the clutch member.

8. The multi-speed drill of claim 7, wherein the maximum torque level capable of being generated at the output spindle in the high speed mode is less than the predetermined torque level.

9. The multi-speed drill of claim 7, wherein the clutch member is coupled to the output spindle and the low speed gear is mounted on the clutch member.

10. The multi-speed drill of claim 9, further comprising a biasing member that biases the low speed gear toward the clutch member.

11. The multi-speed drill of claim 10, further comprising a retaining member supported in a fixed axial position relative to the output spindle, wherein the biasing member biases against the retaining member and the low speed gear.

12. The multi-speed drill of claim 7, wherein at least one of the low speed gear and the clutch member includes at least one cam surface for camming the low speed gear and the clutch member away from each other when torque between the clutch member and the low speed gear exceeds the predetermined torque level.

13. The multi-speed drill of claim 12, wherein each of the clutch member and the low speed gear includes a plurality of cam surfaces, wherein the cam surfaces of the clutch member abut the cam surfaces of the low speed gear for torque transfer therebetween, and wherein the plurality of cam surfaces of the clutch member cam against the plurality of cam surfaces of the low speed gear for camming the low speed gear and the clutch member away from each other when torque between the clutch member and the low speed gear exceeds the predetermined torque level.

14. The multi-speed drill of claim 7, further comprising:
   a motor;
   a first input pinion associated with a secondary drive shaft and driven for rotation by the motor, the first input pinion being coupled to the low speed gear; and
   a second input pinion associated with the secondary drive shaft and driven for rotation by the motor, the second input pinion being coupled to the high speed gear.

15. The multi-speed drill of claim 14, wherein the first input pinion constantly remains in meshing engagement with the low speed gear and the second input pinion constantly remains in meshing engagement with the second input pinion in both the low speed mode and the high speed mode.

16. A multi-speed drill comprising:
   a motor;
   a first input pinion mounted on a secondary shaft that is driven for rotation by the motor;
   a second input pinion mounted on the secondary shaft;
   an output spindle;
   a high speed gear mounted on the output spindle and in constant meshing engagement with the second input pinion and operable to selectively transfer torque between the second input pinion and the output spindle;
   a low speed gear mounted on the output spindle and in constant meshing engagement with the first input pinion, the low speed gear comprising at least one gear cam surface;

a clutch member fixed to the output spindle, the clutch member comprising at least one clutch cam surface configured to cooperate with the at least one gear cam surface;

a biasing member that biases the low speed gear axially toward the clutch member along the output spindle such that the at least one gear cam surface and the at least one clutch cam surface cooperate with each other to transfer torque between the first input pinion and the output spindle, and wherein the at least one gear cam surface and the at least one clutch cam surface cam against each other to thereby move the low speed gear away from the clutch member against a biasing force of the biasing member when torque between the clutch member and the low speed gear exceeds a predetermined torque level; and a shift assembly for selectively changing between a plurality of modes comprising:

a low speed mode for torque transfer between the first input pinion and the output spindle via the low speed gear and the clutch member; and a high speed mode for torque transfer between the second input pinion and the output spindle via the high speed gear so as to bypass the clutch member.

17. The multi-speed drill of claim 16, wherein the biasing member is chosen from a group consisting of a conical spring and a disc spring.

18. The multi-speed drill of claim 16, wherein the maximum torque level capable of being generated at the output spindle in the high speed mode is less than the predetermined torque level.

19. The multi-speed drill of claim 16, wherein the clutch member is coupled to the output spindle and the low speed gear is mounted on the clutch member.

20. The multi-speed drill of claim 16, further comprising a retaining member mounted in a groove on the output spindle, and the biasing member abutting the retaining member to bias the low speed gear axially toward the clutch member.

* * * * *